Dec. 31, 1968  G. M. STEIN  3,419,835
ELECTRICAL WINDING STRUCTURES
Filed March 29, 1967
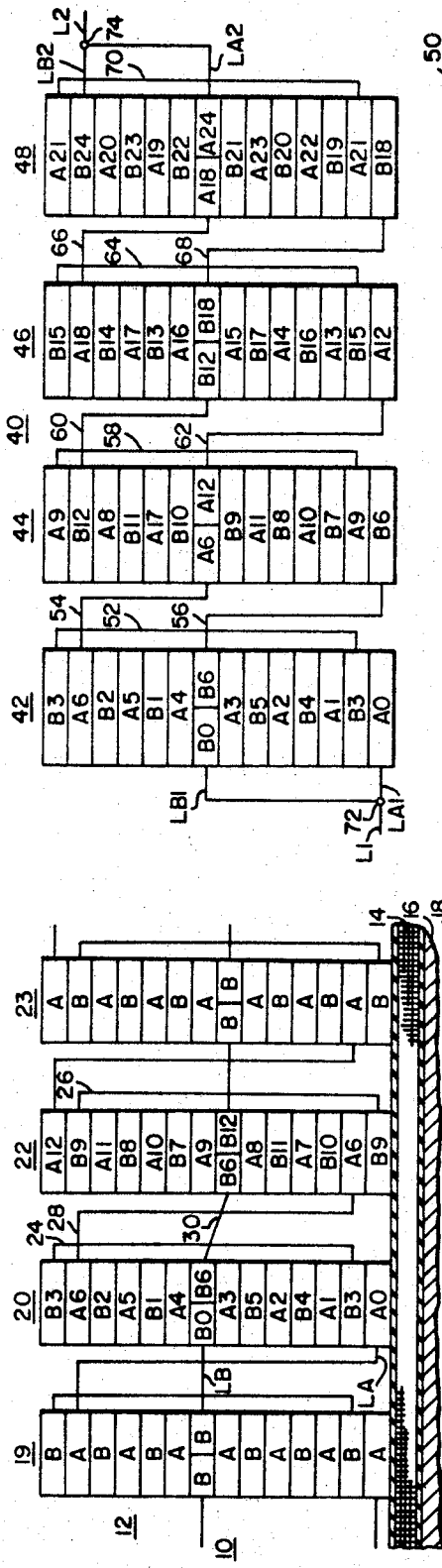
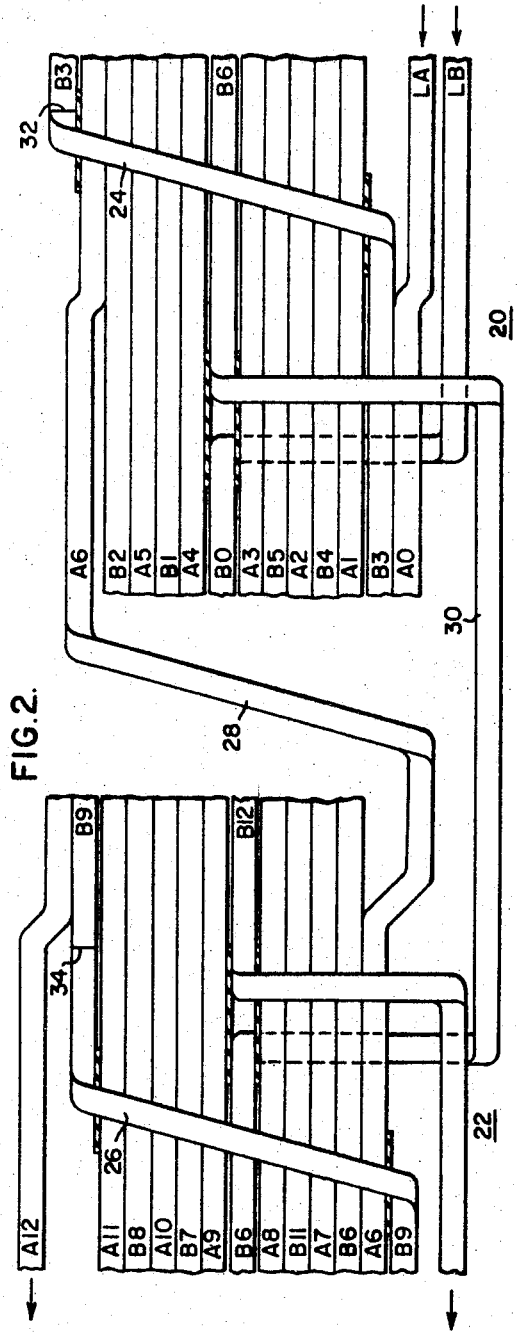
INVENTOR
Gerhard M. Stein
BY Donald R. Lackey
ATTORNEY

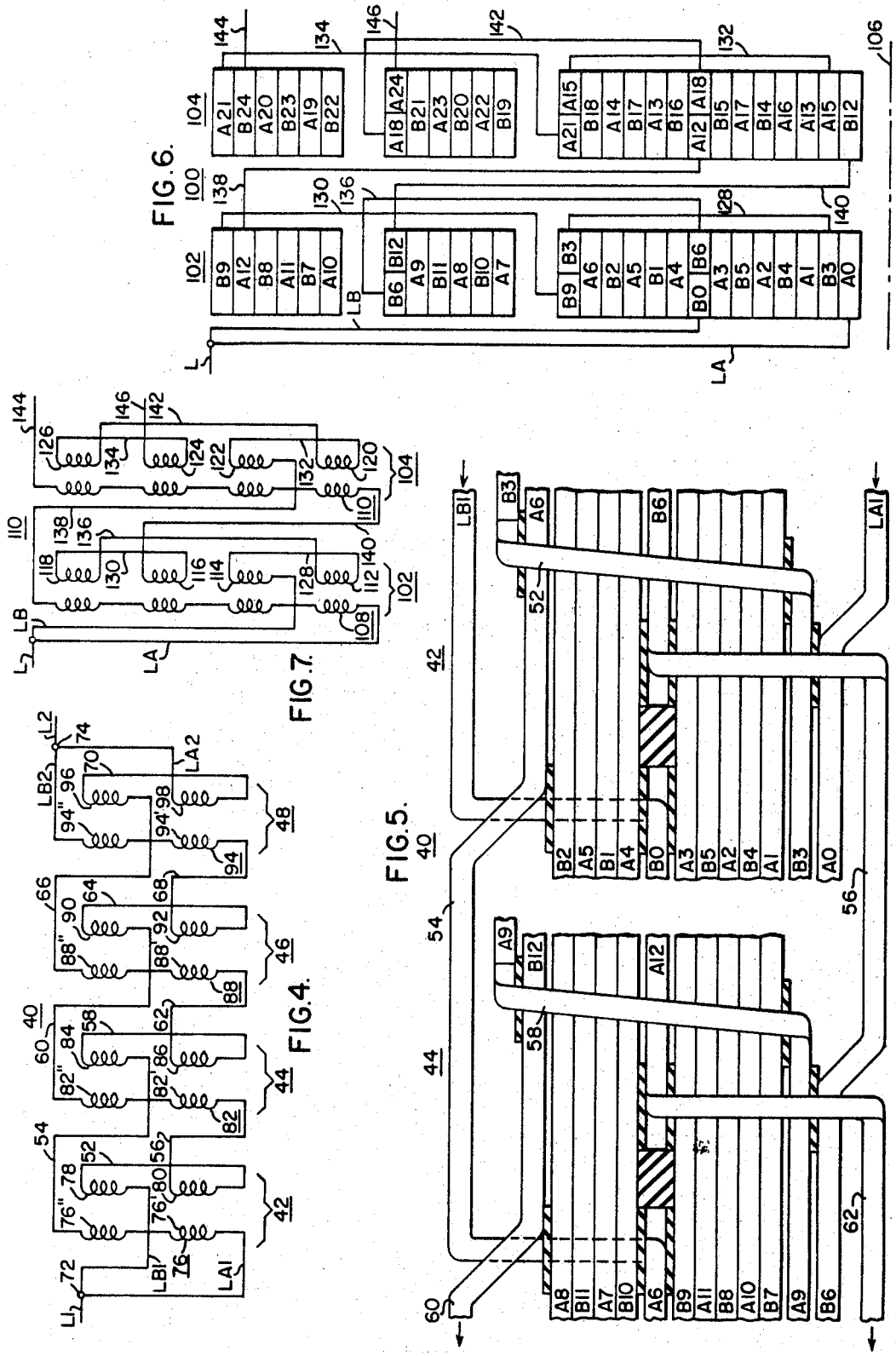

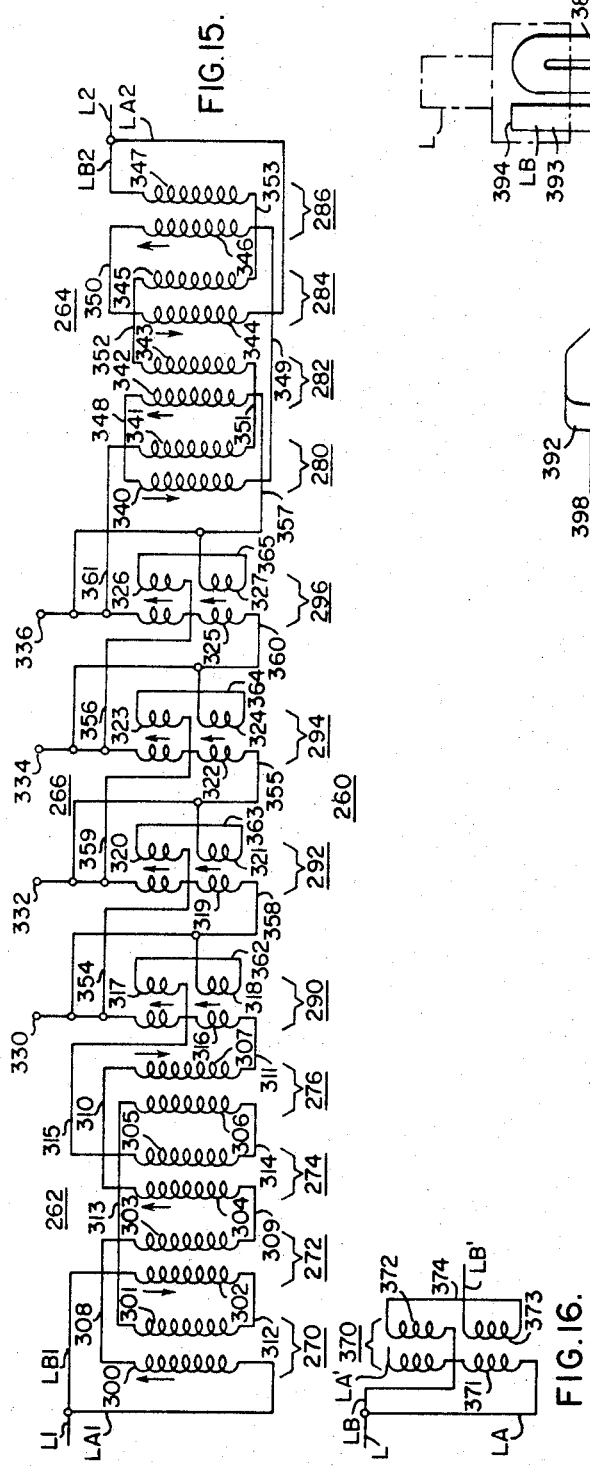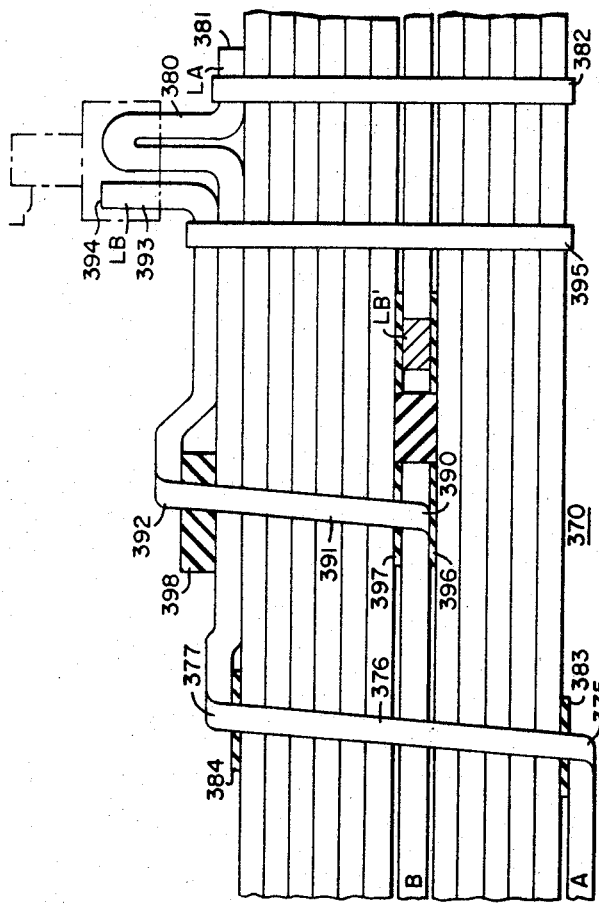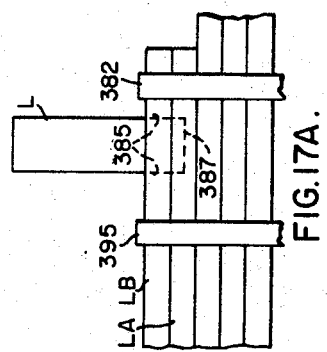

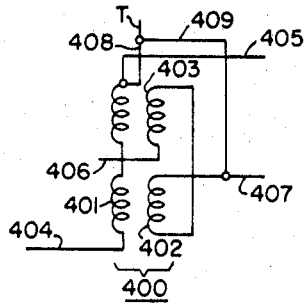
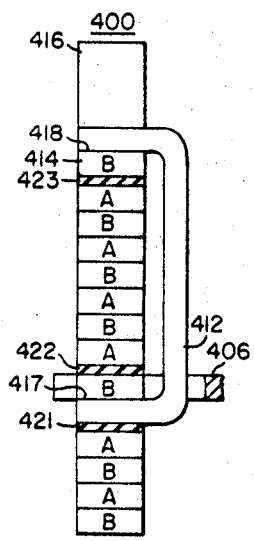
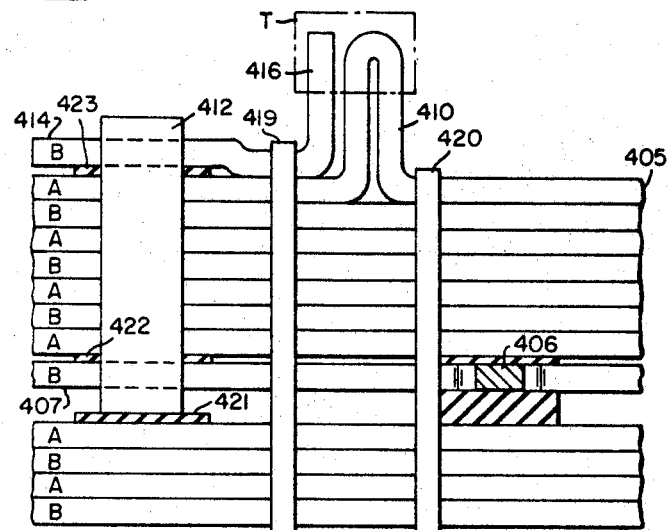
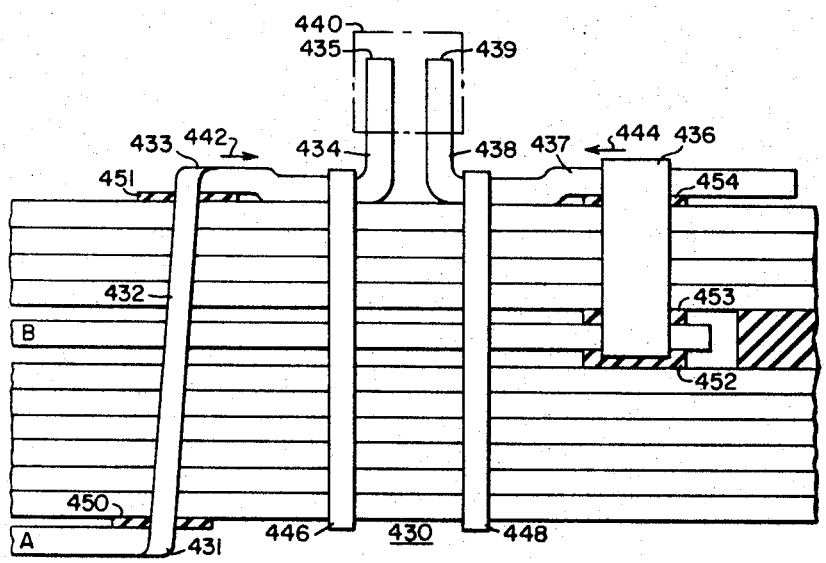
FIG.18.
FIG.20.
FIG.19.
FIG.21.

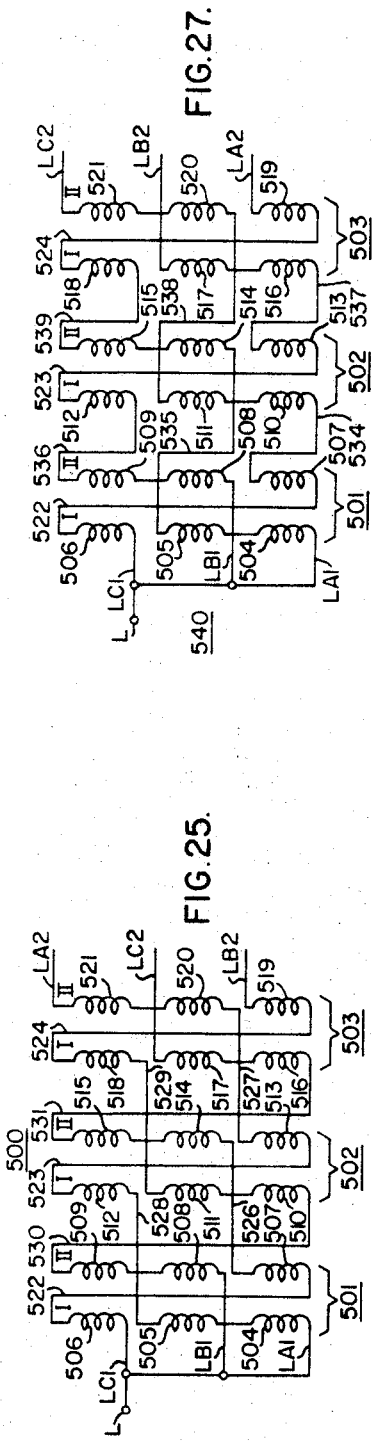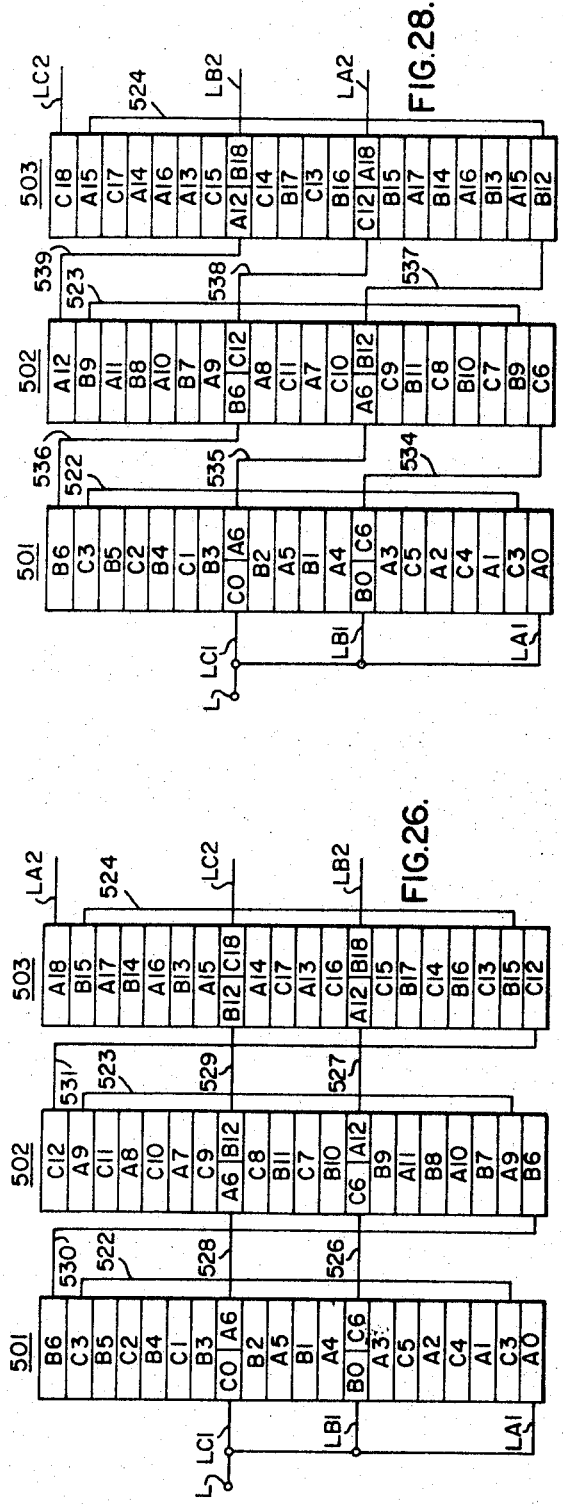

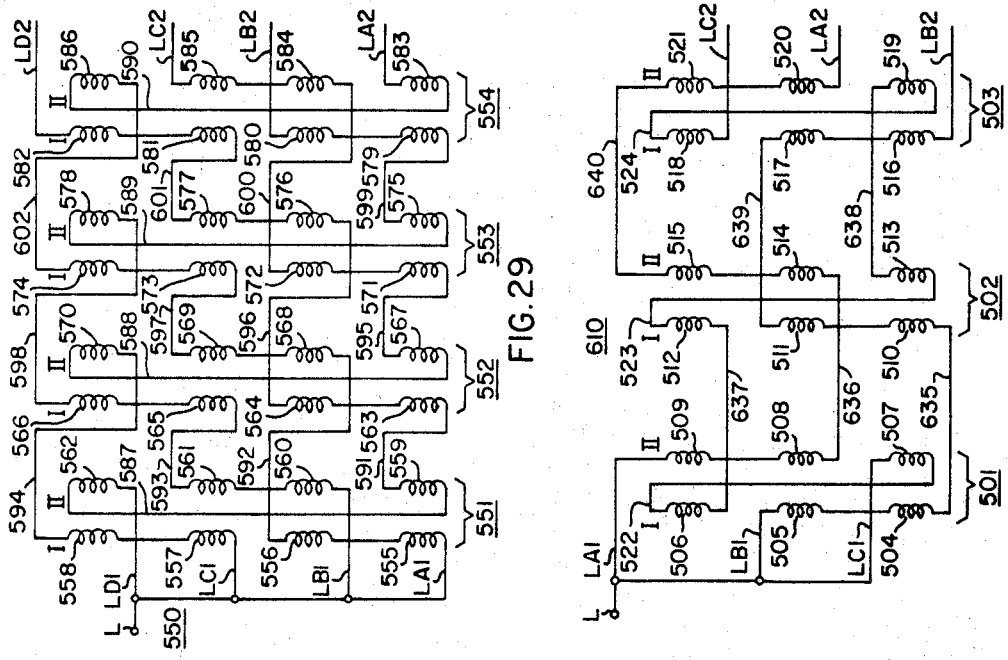
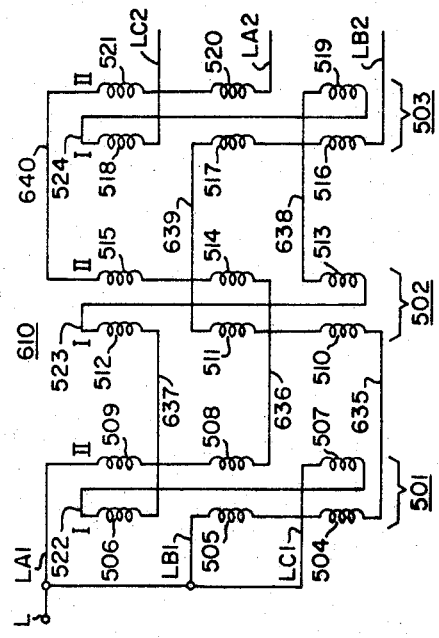
FIG. 29.  FIG. 31.
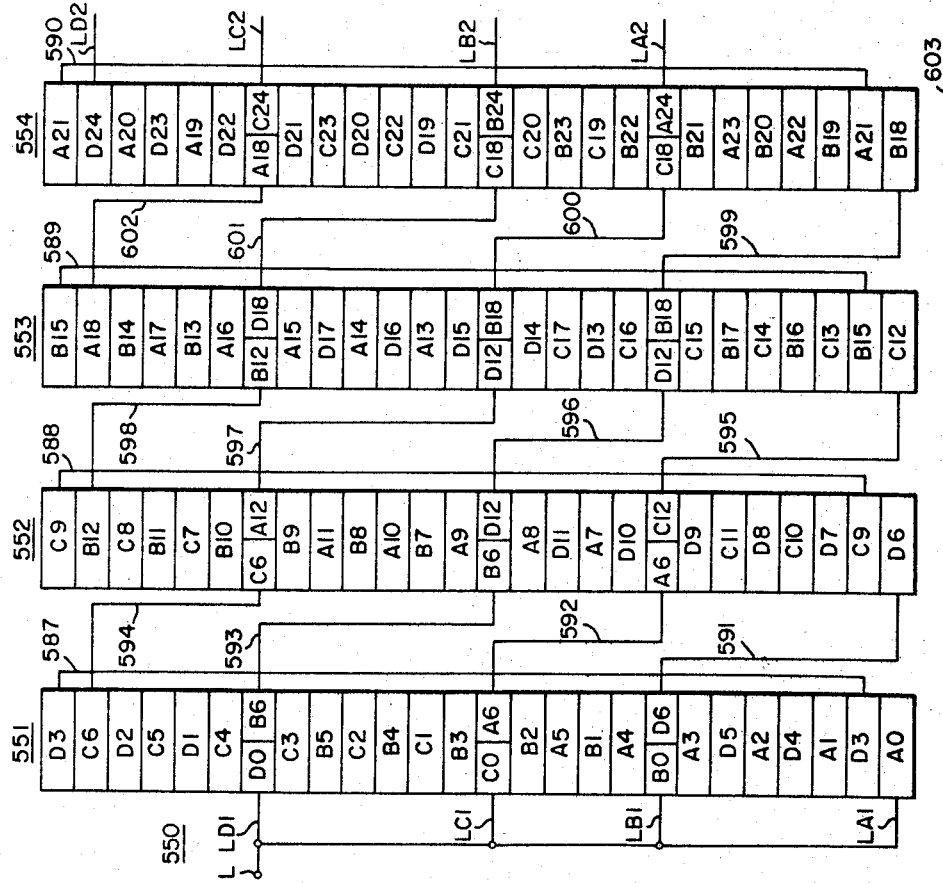
FIG. 30.

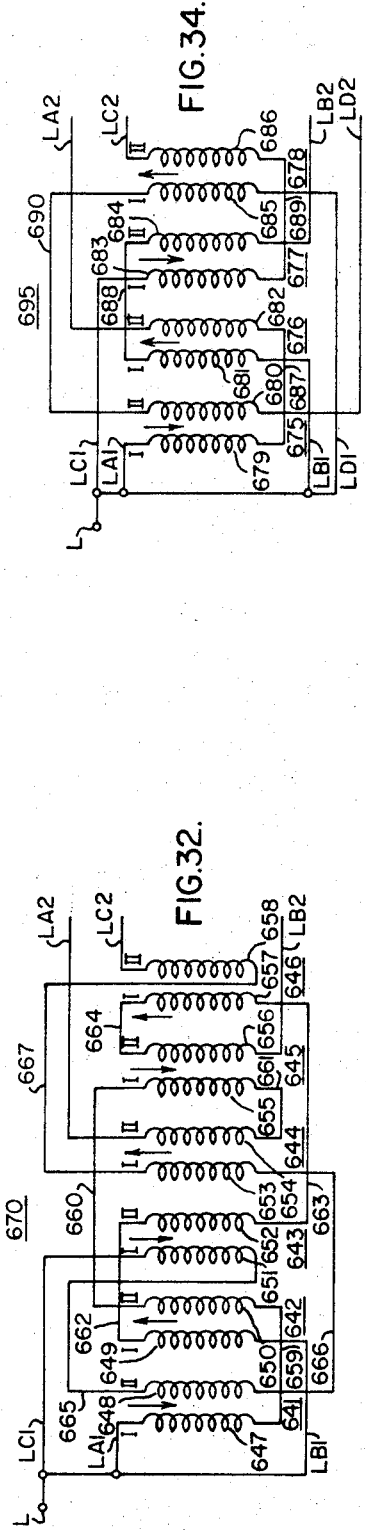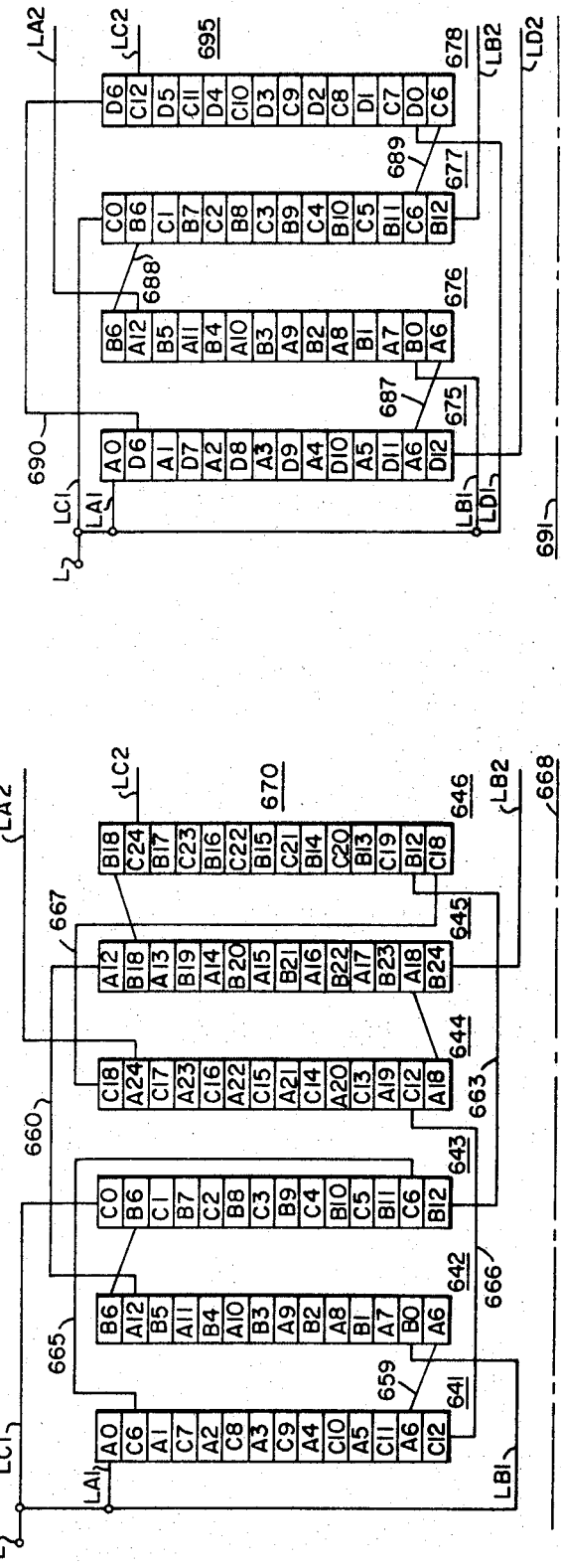

United States Patent Office 3,419,835
Patented Dec. 31, 1968

3,419,835
ELECTRICAL WINDING STRUCTURES
Gerhard M. Stein, Sharon, Pa., assignor to Westinghouse Electric Corporation, Pittsburgh, Pa., a corporation of Pennsylvania
Filed Mar. 29, 1967, Ser. No. 626,866
41 Claims. (Cl. 336—187)

ABSTRACT OF THE DISCLOSURE

Electrical winding structures for power transformers of the core-form type, in which electrically connected turns are interleaved or separated by one or more turns from a different electrical portion of the winding structure, to increase the effective series capacitance of the structure. This is accomplished, in one embodiment of the invention, by having a plurality of side-by-side pancakes each wound from first and second conductive strands spirally wound together to provide first and second radially interleaved sections having start and finish ends. A first connection is made between the finish end of the first section of each pancake coil and the start end of the first section of the next adjacent pancake coil, to provide a first series path through the winding having first and second ends. The second section of each of the pancake coils is severed at substantially its midpoint to provide first and second radial portions in each pancake coil which have inner and outer radially disposed ends. A second connection is made to connect the start and finish ends of the second section together in each of said pancake coils. The outer end of the first radial portion of the second section of each pancake coil is connected with inner end of the second radial portion of the portion of the second section of the next adjacent pancake coil to provide a second series path through the winding having first and second ends. The circumferential locations at which the first and second connections enter the pancake coils at the start ends of the first and second sections are spaced, with their locations relative to one another being reversed in at least two adjacent pancake coils, to transpose the location of the first and second sections.

Background of the invention

Certain types of power transformers of the core-form type, i.e., those having concentrically disposed high and low voltage windings, have a high voltage structure formed of a plurality of disc or pancake type coils. These pancake coils are disposed in spaced side-by-side relation, and are electrically connected in a predetermined manner to form the winding. This type of winding structure inherently distributes surge potential in a non-linear manner, from turn-to-turn in the pancake coils, between the pancake coils across the winding structure, and from the pancake coils to ground. This non-linearity is such that the major portion of the electrical stress is concentrated at the line end of the winding structure, or at the line ends in those applications where both ends of the winding are connected to the line. The degree of non-linearity of surge voltage distribution is indicated by the magnitude of the distribution constant of the winding. The distribution constant, called alpha ($\alpha$) is equal to the square root of the ratio of the capacitance $C_g$ of the winding structure to ground, to the through or series capacitance $C_s$ of the structure. The smaller the distribution constant $\alpha$, the more linear will be the distribution of a surge potential across the turns of the pancake coils, between the pancake coils across the winding structure, and from the pancake coils to ground. Increasing the thickness of the insulation between the turns of the pancake coils adjacent the line end, or ends, of the winding, and increasing the thickness of the insulation between the line end pancake coils, to withstand the increased electrical stress due to surge potentials, is not a practical solution to the problem, as it reduces the effective series capacitance of the winding structure at the line end of the winding, which causes a still more unfavorable surge voltage distribution, and in turn increases the electrical stress. Adding additional insulation between turns and between pancake coils is also undesirable from other viewpoints, as it increases the mean length of the winding turns, and the axial length of the winding structure, which increases the length of the magnetic circuit required, resulting in a larger, heavier, and more costly transformer.

A better approach to the non-linearity problem, is to increase the effective series capacitance of the pancake coils, and of the winding structure, which allows the amount of insulation added for protection against stresses due to surge potentials to be reduced, which also adds to the effective series capacitance of the structure. An excellent method of increasing the effective series capacitance of the pancake coils and the winding structure, is to spirally wind the pancake coils with two or more electrically conductive strands, and to electrically interconnect the strands with each other, and/or with conductive strands of other pancake coils in the winding, such that electrically connected turns are separated or interleaved by one or more turns from an electrically different portion of the winding structure. This method, commonly termed interleaving, connects the turn-to-turn capacitance in parallel, instead of in series, which substantially increases the series capacitance of the pancake coils, and of the complete winding structure.

Many different interleaving structures are known in the art, such as those disclosed in United States Patents 3,090,022 issued May 14, 1963; 3,278,879, issued Oct. 11, 1966; 3,299,385, issued Jan. 17, 1967 and 3,246,270 issued Apr. 12, 1966, all assigned to the same assignee as the present application, and United States Patent 3,260,978, issued July 12, 1966.

When the current rating of an electrical winding structure is increased, the cross-sectional area of the electrical conductor must be increased accordingly. In order to reduce losses in the winding structure due to eddy currents, which losses vary with the third power of the dimension of the conductor at right angles to the direction of the leakage flux, the conductor may be sub-divided into two or more conductive strands which are insulated from one another, except at the start and finish ends of the winding structure, and at any tap connection points on the winding. The reduction in eddy current losses by stranding the conductor may be offset, however, by losses due to circulating currents in the parallel connected strands, if each strand is not subjected to the same net leakage flux. Therefore, it is necessary to transpose the relative positions of the strands between the junction points of the parallel connected strands.

Transposition of parallel connected strands, while simple in theory, is not always easy to achieve mechanically in certain types of interleaved turn winding structures. When the pancake coils which make up the winding structure are start-start, finish-finish connected, in which the "start" of the pancake coil is the start of its inner turn, and the "finish" of the pancake coil is the end of its outer turn, the pancake coils in which the circuit first enters the inner turn are machine wound, and the pancake coils in which the circuit enters the outer turn are first machine wound, to gather the correct amount of conductor, and then the pancake coil is collapsed and rewound in reverse sequence by hand, in order to keep the connections between the pancake coils as short as possible, and to preclude severing the conductor. Winding structures wound in this manner which have two parallel circuits automatically transposes the relative positions of the two circuits from pancake coil to pancake coil, with the two circuits occupying the same position in all machine wound coils, and reversing their positions in the alternate hand wound coils. It is not desirable, however, to manufacture all interleaved multi-stranded electrical winding structures with start-start, finish-finish connections, as the hand winding of alternate pancake coils increases the cost of the winding structures.

In describing the various types of interleaving arrangements, it will be helpful to set forth certain definitions. As used in this specification, "single interleaving" will refer to one basic interleaving arrangement per pancake coil, "double interleaving" will refer to two similar basic interleaving arrangements per pancake coil, "twin interleaving" will refer to the arrangements which require two pancake coils to complete a basic interleaving arrangement, "mutual interleaving" will refer to the arrangement where parallel connected conductors are interleaved with one another, and "self-interleaving," refers to arrangements where the parallel connected conductors are interleaved with themselves, in addition to interleaving other conductors.

Accordingly, it is an object of the invention to provide a new and improved high series capacitance interleaved turn type winding structure for electrical transformers.

Another object of the invention is to provide a new and improved winding structure of the type which has a plurality of interleaved turn type pancake coils, and two or more parallel connected electrically conductive strands, which transposes the relative positions of the strands between certain pancake coils, while using all machine wound coils.

Still another object of the invention is to provide a new and improved method of winding electrical winding structures of the type having a plurality of machine wound, interleaved turn type pancake coils, and two or more parallel connected conductive strands, which method automatically provides a transposition of the electrically conductive strands from pancake coil to pancake coil.

A further object of the invention is to provide a new and improved winding structure which has a new and improved arrangement for interconnecting parallel connected conductive strands.

Another object of the invention is to provide a new and improved electrical winding structure having at least two parallel connected paths through a plurality of interleaved turn type pancake coils, which facilitates the making of electrical connections between pancake coils which are not disposed immediately adjacent one another.

Still another object of the invention is to provide new and improved electrical winding structures which have three or more parallel connected circuits, but which require only two conductive strands to be wound at any one time.

Summary of the invention

Briefly, the present invention accomplishes certain of the above-cited objects by alternating the relative circumferential positions of the interleaving connection, and the start-finish connection, between certain pancake coils on machine wound type, two conductor, mutually single interleaved finish-start, center-center-connected winding structures, when it is desired to transpose the relative positions of the two conductors. This type of winding structure has one straight through conductor in each pancake coil, with all of the straight through sections of the pancake coils being connected together with finish-start conections, and one conductor which enters the center of the winding build, and spirals to the outer edge, returns to the inner edge of the pancake coil via an interleaving connection, and spirals back to the center where it leaves and is connected to the center of the build of the next pancake coil, via a center-center connection.

This arrangement of alternating the circumferential locations where the interleaving connection and the start-finish connection enter the pancake coil, between two adjacent pancake coils, will automatically transpose the relative positions of the two circuits through the adjacent pancake coils.

In another embodiment of the invention, a winding structure having a plurality of similar two conductor, mutually single interleaved pancake coils, are interconnected with finish-center, and center-start connections, instead of finish-start and center-center connections. This arrangement provides a transposition of the conductor turns of the two circuits through the winding from pancake coil to pancake coil.

This latter winding assembly may be constructed with a new winding method in which the outer half of one pancake coil is wound simultaneously with the first half of the next adjacent pancake coil, with only one joint in the electrical conductors being required per pancake coil.

When the two conductor, mutually single interleaved pancake coil is used in a tapped section of a winding, both conductors of the parallel circuits must be connected together and to a tap lead. This invention teaches the bringing of both leads to the outer surface of the pancake coil to be tapped, in a manner which reduces the amount of space required, and which increases the mechanical strength of the connection. The same basic teachings for bringing tap connections out of the transformer, may also be applied in connecting the two circuits together at the "start" and "finish" ends of the winding.

When pancake coils which are not immediately adjacent one another are to be electrically connected, the interconnecting lead presents a problem when the coils are pressed into their final winding structure dimensions, as the pressing deforms the long interconnecting lead, which may cause it to contact adjacent pancake coils and eventually cause a short circuit and failure of the winding. This invention teaches an arrangement whereby this long lead will only deform to the extent of the electrical connections between adjacent pancake coils. According to the teachings of the invention, this long interconnecting lead is bent sequentially into the plane of each of the intervening pancake coils, where it proceeds adjacent to an inner or outer turn of the intervening coils for a short predetermined distance, which in effect provides a partial turn for these intervening coils. Thus, the electrical connection enters each intervening coil with a short bend similar to the interconnections between coils which electrically connect the coils. Then, when the pancake coils are pressed into their final dimensions, the long leads deform only slightly, and only to the extent of short electrical connections between adjacent pancake coils.

Still another embodiment of the invention teaches winding structures utilizing three and four parallel circuits, while only winding two conductive strands at any one time.

Brief description of the drawings

Further objects and advantages of the invention will become apparent from the following detailed description taken in connection with the accompanying drawings, in which:

FIGURES 1 and 2 are diagrammatic and side views, respectively, of a finish-start connected, two conductor, mutually single interleaved winding assembly, in which all pancake coils are of the machine wound type, and with a transposition of the two conductors being obtained according to the teachings of the invention, FIGS. 3, 4 and 5 are diagrammatic, schematic, and side views, respectively, of a two conductor mutually single interleaved winding assembly, with adjacent pancake coils being interconnected with finish-center, center-start connections, according to the teachings of the invention, which transposes the two circuits from pancake coil to pancake coil, FIGS. 6 and 7 are diagrammatic and schematic views of a two conductor, mutually double interleaved winding assembly constructed according to the teachings of the invention, FIG. 15 is a schematic diagram of a complete winding assembly illustrating the use of the winding structure shown in FIGS. 3, 4 and 5 in the tapped section of the winding structure, FIGS. 16 and 17 are schematic and side views, respectively, of a start connection for a two conductor, mutually single interleaved pancake coil constructed according to the teachings of the invention, FIG. 17A is fragmentary view of the pancake coil shown in FIG. 17, illustrating another arrangement which may be used, FIGS. 18, 19 and 20 are schematic, diagrammatic and side views, respectively, of a tap connection for a two conductor, mutually single interleaved pancake coil, constructed according to the teachings of the invention, FIG. 21 is a side view of another tap connection for a two conductor, mutually single interleaved winding. constructed according to the teachings of the invention, FIGS. 25 and 26 are schematic and diagrammatic views, respectively, of three conductor mutually single interleaved pancake coils constructed and interconnected according to another embodiment of the invention, FIGS. 27 and 28 are schematic and diagrammatic views, respectively, of three conductor mutually single interleaved pancake coils constructed and interconnected according to another embodiment of the invention.

FIGS. 29 and 30 are schematic and diagrammatic views, respectively, of four conductor mutually single interleaved pancake coils constructed and interconnected according to the teachings of the invention, FIG. 31 is a schematic diagram of three conductor mutually single interleaved pancake coils, constructed and interconnected according to the teachings of the invention, FIGS. 32 and 33 are schematic and diagrammatic views, respectively, of a three circuit winding which has only two interleaved circuits per pancake coil, and FIGS. 34 and 35 are schematic and diagrammatic views, respectively, of a four circuit winding which has only two interleaved circuits per pancake coil.

*Description of preferred embodiments*

Figure 8:
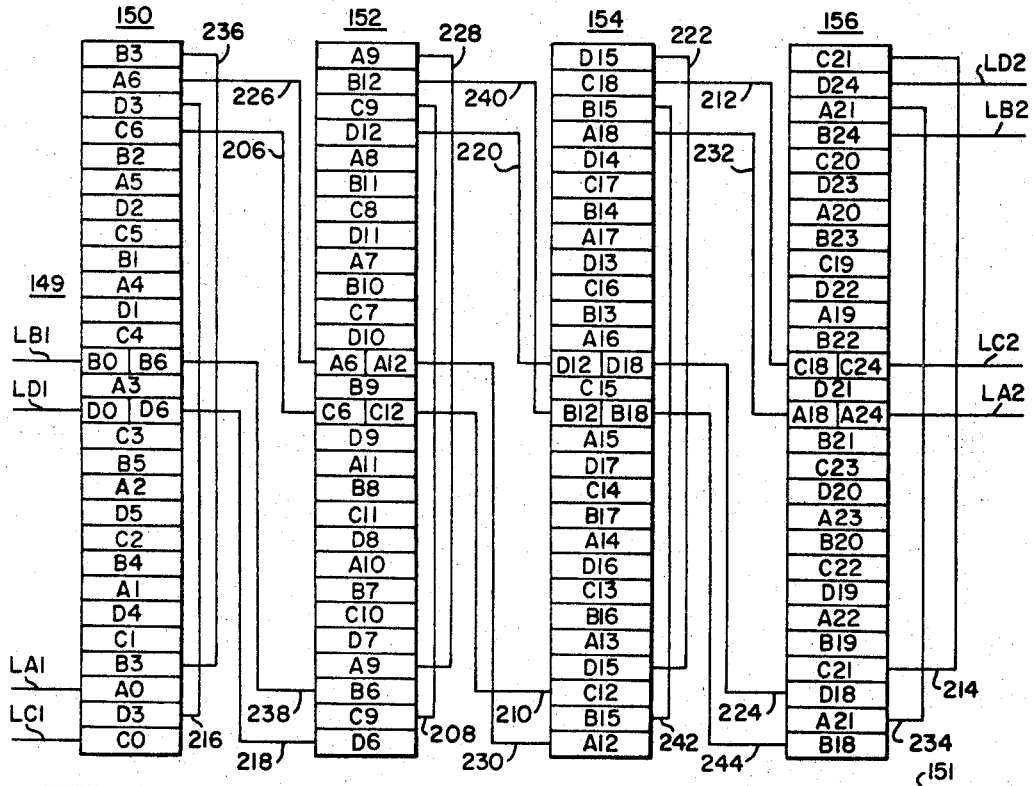
FIGS. 8 and 9 are diagrammatic and schematic views of a four conductor, mutually single interleaved winding constructed according to the teachings of the invention.

Referring now to the drawings, and FIGS. 1 and 2 in particular, there is shown a fragmentary cross-sectional view of a transformer 10 of the core-form type, having high and low voltage winding assemblies 12 and 14, respectively, concentrically disposed about a leg of a magnetic core 16. Since the winding assemblies 12 and 14 are symmetrical about center line 18, only half of the windings are shown in FIG. 1.

High voltage winding assembly 12 is of the type which includes a plurality of pancake type coils such as pancake coils 19, 20, 22 and 23, disposed in spaced side-by-side relation, with their openings in alignment. For purposes of simplifying the drawings, only four pancake coils are shown, but it will be understood that as many pancake coils may be utilized as required by a particular application. Also, the number of conductor turns shown in the pancake coils is for illustrative purposes only, with pancake coils which are used in an actual winding structure usually having a large plurality of conductor turns.

Pancake coils 19, 20, 22 and 23 are similar in construction to those disclosed in my copending application Ser. No. 351,674 filed Mar. 13, 1964, now U.S. Patent 3,299,385, each having two parallel circuits, which are mutually single interleaved. However, in order to obtain a transposition of the two circuits in my copending application, adjacent pancake coils were interconnected with start-start, finish-finish connections. Pancake coils constructed according to the teachings disclosed in the aforesaid copending application, connected with finish-start connections, would not provide a transposition of the two circuits. While start-start, finish connections have the advantage of reducing the number of interconnecting leads which must traverse the radial build dimension of the pancake coils in the ducts or spaces between adjacent pancake coils, it has the disadvantage of requiring alternate pancake coils to be collapsed after normal machine winding, and wound in reverse sequence by hand, in order to preclude cutting the conductors and rebrazing them between each pancake coil, and to provide as short an interconnection between pancake coils as possible. It would be more desirable, at least in certain applications, to utilize all machine wound pancake coils and interconnect them with finish-start connections. However, as hereinbefore mentioned, this produces a winding structure in which the two parallel circuits occupy the same positions in each pancake coil, which greatly increases the losses of the winding structures due to circulating currents. FIGS. 1 and 2 illustrate an embodiment of my invention in which all machine wound type coils are used, and in which a transposition of the two circuits may be obtained when desired, usually at least once between junction points of the two circuits.

More specifically, it will be assumed that a transposition of the two circuits is desired between pancake coils 20 and 22 of FIG. 1. Since pancake coils 19 and 20 will then be similar in construction and interconnections and pancake coils 22 and 23 will be similar in construction and interconnections, only pancake coils 20 and 22 will be described in detail.

Pancake coils 20 and 22 may be described as being formed by spirally winding two insulated electrically conductive strands together, which will be called the A and B conductors, with the A and B conductors thus appearing at alternate turns in the radial build of the pancake coils. While the pancake coils are described as being formed by two conductive strands spirally wound together, it will be understood that the actual method of winding the coils may be different. One of the two conductive strands, such as the B conductor, is "severed" or divided at substantially its midpoint, to form first and second radial portions having adjacent ends and opposite ends; or, inner ends, with respect to the inner turn of the pancake coil, and outer ends. The outer end of the outer or second radial portion of the B section is interconnected with the inner end of the inner or first radial portion of the B section, via electrical conductor 24 in pancake coil 20, and via electrical conductor 26 in pancake coil 22. The A circuit enters pancake coil 20 via conductor LA at the end of the inner turn of the A conductor, and the A circuit spirals outwardly, appearing at every other turn, with the A turns being numbered consecutively, until reaching the end of turn A6.

The B circuit enters the inner end of the outer radial portion of pancake coil 20 via conductor LB and, in order to make the radial direction of the current in the B circuit the same as the radial direction of the current in the A circuit, the B circuit spirals outwardly in the outer radial portion of the B section of the pancake coil, appearing at every other turn, until reaching the end of turn B3, where it returns to the start of the inner radial portion via conductor 24. The outer turn of the outer radial portion, and the inner turn of the inner radial portion, are both referenced B3, to denote that they are substantially at the same potential. The B circuit then spirals outwardly again through the inner radial portion until reaching the end of turn B6. Since the radial direction of the power flow in pancake coil 20 is from the inner turn outwardly, it is called a machine wound type pancake coil, as it may be wound automatically on a rotating mandrel. Thus, in summary, pancake coil 20 has two sections, an A section and a B section, and the B section is divided into two radial portions, an inner and an outer portion.

The A and B circuits then continue from pancake coil 20 to pancake coil 22, with the A circuit proceeding from the end of the straight through A section in pancake coil 20, to the start of the straight through A section in pancake coil 22, via electrical conductor 28. The B circuit proceeds from the end of the inner radial portion of the B section of pancake coil 20, which is at substantially the center of the radial build of pancake coil 20, to the start of the outer radial portion of the B section of the pancake coil 22, which is at substantially the center of the radial build of pancake coil 22, via conductor 30. The A and B circuits in pancake coil 22, however, have exchanged positions, relative to their positions in pancake coil 20, in order to effect the desired transposition. Instead of the A circuit entering the innermost turn, as in pancake coils 19 and 20, it enters the turn next to the bottom of the radial build. This conductor, starting at turn A6, then spirals outwardly through the complete radial build, appearing at alternate turns until reaching the end of turn A12, where the A circuit leaves pancake coil 22 and proceeds to pancake coil 23, which is similar to pancake coil 22. The remaining conductor of pancake coil 22 is the B circuit, having inner and outer radial portions. The B circuit enters the inner end of the outer radial portion at turn B6, spirals outwardly to the end of turn B9, returns to the inner end of the inner radial portion via conductor 26, and spirals outwardly to the end of turn B12, at which point the B circuit leaves pancake coil 22 and enters pancake coil 23, which is similar to pancake coil 22. Thus, FIG. 1 illustrates in a schematic way the desired transposition of two circuits using all machine wound pancake coils interconnected with finish-start, center-center connections. FIG. 2 illustrates how this transposition may be actually accomplished.

FIG. 2, which is a side view of pancake coils 20 and 22 shown in FIG. 1, illustrates how this transposition of the A and B circuits may be realized, with the necessity of making only one braze joint per pancake coil.

Pancake coil 20 may be wound by starting conductive strand LA on a winding mandrel, with conductive strand LA being a continuous conductor from the finish of the immediately adjacent pancake coil 19, and by starting the B conductive strand from a reel by first bending it to form interleaving connection 24, and then starting the B circuit at turn B3 on top of conductor LA, which forms turn A0. Although conductor LA is on the bottom of the spiral build, it should be noted that the interleaving connection 24 actually starts into the coil at an earlier point than conductor LA.

The A and B conductive strands are then wound together on a mandrel until reaching the end of turns A3 and B6, at which point the conductor from B6 is allowed to leave the coil and await the winding of the adjacent pancake coil 22, where it will form interconnection 30 and the outer radial section of the B circuit of pancake coil 30. The conductor LB is introduced, which may be continuous from the end of the inner radial B section of a pancake coil 19, and the conductive strand LB is wound with the conductive strand of the A circuit until the required number of turns are completed. The B circuit conductor is severed at the end of its outer turn B3 and brazed at junction 32 to the preformed interleaving connection 24. The A conductive strand, at the end of turn A6 is continued to the start of pancake coil 22, thus forming finish-start connection 28.

In starting pancake coil 22, the A circuit may be started by the continuous A conductor from finish-start connection 28, and the B circuit is started from a reel of electrical conductor, by first forming interleaving connection 26. Instead of placing the finish-start connection on the bottom next to the mandrel, however, the interleaving connection and its conductor is started on the bottom next to the mandrel, which turn is referenced B9, and the finish-start connection is placed on top of this conductor, which turn is referenced A6. It should be noted that even though conductor B9 forms the bottom turn, that the finish-start connection actually starts into the coil at an earlier point than does the interleaving connection. Thus, the circumferential locations of the start of the interleaving connection, and the start of the finish-start connection in the two coils 20 and 22 is reversed. The reversal of the circumferential locations of start of the interleaving connections and the start of the finish-start connections provides the desired transposition of the A and B circuits from pancake coil 20 to pancake coil 22. Pancake coil 22 is then wound to the end of turns A8 and B12, at which point the end of turn B12 leaves the pancake coil and awaits the winding of the next adjacent pancake coil 23, and the end of turn B6 from pancake coil 20 is introduced into pancake coil 22 and wound with the A conductor to complete pancake coil 22. The A conductor proceeds to the next pancake coil 23, and the B conductor is severed and brazed to the end of the preformed interleaving connection 26 at junction 34.

The two conductor mutually single interleaved winding structure, interconnected with finish-start and center-center connections, and transposed as shown in FIGS. 1 and 2, or interconnected with finish-finish and start-start connections, which automatically transposes the A and B circuits due to the alternate machine and hand winding necessary for the pancake coils, provides excellent winding structures having a high series capacitance. However, in certain instances, on pancake coils having certain dimensions and number of conductor turns, and with surge voltages having certain rise and fall times, the winding structures just described have been found to produce oscillations which may substantially increase the electrical stress between the turns of the pancake coils, between adjacent pancake coils and between the interleaving connection and its own pancake coil, especially at the midpoint of the radial build on the pancake coils of the winding. The embodiment of the invention shown in FIGS. 3, 4 and 5 teaches how to utilize two conductor, mutually single interleaved windings, without producing these oscillations in the winding, while using the same winding and coil dimensions, the same number of pancake coils and conductor turns, and the same surge potential waveforms, which produced oscillations in the hereinbefore described winding structures. In addition to eliminating these oscillations, the new winding arrangement, which will now be described, possesses many other advantages, among which are an automatic transposition of the A and B circuits from pancake coil to pancake coil, and the structure may be formed by a new and improved winding method.

More specifically, FIGS. 3, 4 and 5 are diagrammatic, schematic, and side views, respectively, of a new two conductor, mutually single interleaved winding structure 40, which uses identical machine wound pancake coils. Only four pancake coils 42, 44, 46 and 48 are shown in FIGS. 3 and 4, in order to simplify the drawings, and FIG. 5 illustrates side views of pancake coils 42 and 44. Pancake coils 42, 44, 46 and 48 are symmetrical about center line 50, and will be associated with a low voltage winding and magentic core (not shown) as hereinbefore described with respect to FIG. 1.

Pancake coils 42, 44, 46 and 48 are all of the machine wound type, i.e., those in which the electrical circuit first enters the inner turns of the conductive strands or sections and spirals to the outer turns of the sections, which allows the pancake coils to be machine wound on a rotating mandrel, and the pancake coils per se are schematically similar to the individual pancake coils shown in FIG. 1. In other words, each pancake coil, such as pancake coil 42, includes two conductive strands which spiral together from the ends of the inner turns to the ends of the outer turns, with one of the conductive strands being continuous or straight through the pancake coil, and one of the conductors being discontinuous, forming substantially equal inner and outer radial portions each having an inner and an outer end. Thus, each pancake coil has an A and a B section, with one of the sections having inner and outer radial portions. The outer end of the outer radial portion, and the inner end of the inner radial portion, are connected together in each pancake coil, such as with inter-leaving connections 52, 58, 64, and 70 in pancake coils 42, 44, 46, and 48, respectively. However, instead of connecting the finish end of the straight through section of pancake coil 42, to the start of the straight through section of the adjacent pancake coil 44, and the outer end of the inner radial portion of pancake coil 42 to the inner end of the outer radial portion of pancake coil 44, the pancake coils are all interconnected with finish-center, and center-start connections. In other words, the end or finish of the straight through section 76 of pancake coil 42, as shown in FIG. 4, is connected to the inner end of the outerradial portion 78 of pancake coil 44, via finish-center connection 54, and the outer end or finish of the inner radial portion 80 of pancake coil 42 is connected to the start or inner end of the straight through section 82 of pancake coil 44, via center-start connection 56. Continuing this basic pattern, the finish of the straight through section 82 of pancake coil 44 is connected to the inner end of the outer radial portion 90 of pancake coil 46 via finish-center connection 58, and the outer end or finish of the inner radial portion 86 of pancake coil 44 is connected to the inner end or start of straight through section 88 of pancake coil 46. The finish of the straight through section 88 of pancake coil 46 is connected to the start or inner end of the outer radial section 96 of pancake coil 47, via finish-center connection 66, and the outer end of the inner radial portion 92 of pancake coil 46 is connected to the start or inner end of the straight through section 94 of pancake coil 48, via center-start connection 68. The A and B sections or circuits are connected together at the start and finish of winding 40, such as at junction 72 of conductors LA1 and LB1 at the start of the winding, and at the junction 74 of conductors LA2 and LB2 at the finish of the winding. Thus, instead of the A circuit proceeding through the winding structure through all straight through sections, and the B circuit proceeding through the windings in all "looped" type sections, the A and B circuits are "mixed," appearing in a straight through section in one pancake coil and in a looped section in the next pancake coil, across the winding. Thus, this type of winding structure will be referred to as a two conductor, mutually single interleaved, mixed type winding. As shown in the side view in FIG. 5, all pancake coils and their interconnections are similar, making it easier to manufacture the winding. This arrangement also automatically provides a transposition of the A and B circuits from pancake coil to pancake coil, while using all machine wound type coils.

The basic principles of this two conductor, mutually single interleaved, mixed type winding structure may be extended to two conductor multiple interleaving by radially repeating the basic interleaved winding arrangement shown in FIG. 4. For example, FIGS. 6 and 7 are diagrammatic and schematic views, respectively, of a two conductor, mutually double interleaved, mixed winding 100, of which two pancake coils 102, and 104, are shown, which are symmetrical about center line 106.

Each pancake coil 102 and 104 has a straight through section, 108 and 110, respectively, as shown in FIG. 7, and each has four radial portions, which make up another section in each pancake coil. Pancake coil 102 has radial portions 112, 114, 116 and 118, and pancake coil 104 has radial portions 120, 122, 124 and 126. The inner two radial portions 112 and 114 of pancake coil 102 have their opposite ends connected via conductor 128, and the outer two radial portions 116 and 118 have their opposite ends connected via conductor 130. In like manner, the inner two radial portions 120 and 122 of pancake coil 104 have their opposite ends connected via conductor 132, and the outer two radial portions 124 and 126 have their opposite ends connected via conductor 134. The line conductor L is connected to conductors LA and LB, and the LA conductor is connected to the start or inner turn of the straight through section 108 of pancake coil 102, and the A circuit spirals outwardly, appearing at every other turn, as shown in FIG. 6, until reaching the end of turn A12. The LB conductor is connected to the inner end or start of the second radial section 114, at turn BO, and the B circuit spirals outwardly to the end of section 114 and returns to the start or inner end of the first radial section 112, via conductor 128. The B circuit spirals outwardly again to the end of the first radial section 112, and then proceeds to the start or the inner turn of the fourth radial section 118 via conductor 136. The B circuit then spirals outwardly to the end of the fourth radial section 118, and it returns to the start or inner end of the third radial section via conductor 130, and again spirals outwardly to the end of the third radial section at the end of turn B12.

Instead of the A section of pancake coil 102 being connected to the straight through section 110 of pancake coil 104, it is connected to the start or inner turn of the second radial section 122 via conductor 138, and the B circuit is connected to the straight-through section 110, via conductor 140. Thus, the A circuit traverses the second radial portion 122 of pancake coil 104, and then the first radial portion 120, it proceeds via conductor 142 to the fourth radial section 126, it traverses the fourth radial section and proceeds to the third radial section 124 via conductor 134, it traverses the third radial section 124 and leaves this section via conductor 146. Conductors 144 and 146 from the B and A circuits then proceed to the next pancake coil where they make connections similar to those just described for these circuits in pancake coil 102, and the basic pattern established for pancake coils 102 and 104 is followed to the end of the winding, or winding section, where the A and B conductors may again be connected together, similar to their connection at the start of the winding, or winding section. Thus the pancake coils of winding 100, such as pancake coil 102, each have two sections, one being a straight through section, and one of the sections having four radial portions.

Figure 9:
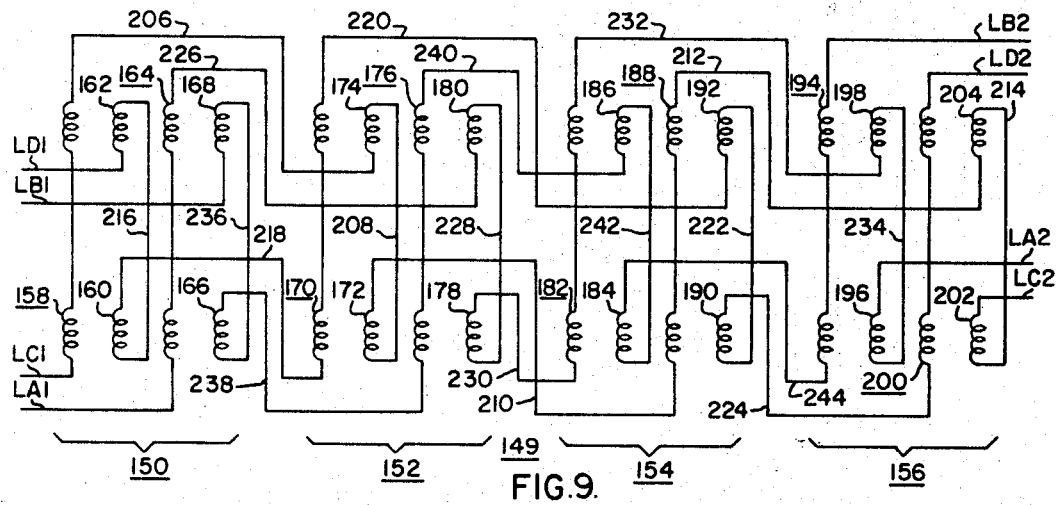

The principles of the two conductor, mutually single interleaved, mixed type winding may also be extended to any even numbered plurality of conductors, for greater current carrying ability. For example, a four conductor, mutually single interleaved, mixed winding is shown in FIGS. 8 and 9, which are diagrammatic and schematic representations, respectively. When using four parallel connected conductors, the positions of the conductive strands may be changed between two pancake coils, and then this basic arrangement repeated for each succeeding pair of pancake coils. However, when using four conductors, if a complete transposition is required, the basic interleaving arrangement will require four pancake coils. With four pancake coils, each of the four circuits may occupy the position of each of the other circuits at least once in this basic arrangement. More specifically, FIGS. 8 and 9 illustrate a winding structure 149, in which four pancake coils 150, 152, 154 and 156 are shown, which are symmetrical about center line 151. Each of the pancake coils, such as pancake coil 150, may be considered as being constructed by first, second, third and fourth conductive strands which are radially wound together to provide a predetermined number of turns. Thus, each pancake coil has four sections. Two of the conductors form straight through sections, and two of the conductors are divided at substantially their midpoints to each form first and second radial portions, each having inner and outer ends, with the outer end of the second or outer radial portion being connected to the inner end of the first or inner radial portion. Thus, pancake coil 150 may have straight through sections 158 and 164, a looped section which includes inner and outer radial portions 160 and 162, which have their opposite ends connected via conductor 216, and a looped section which includes inner and outer radial portions 166 and 168, respectively, which have their opposite ends interconnected via conductor 236. Pancake coil 152 has straight through sections 170 and 176, and a first looped section which includes inner and outer radial portions 172 and 174, respectively, the opposite ends of which are interconnected via conductor 208, and a second looped section which includes inner and outer radial portions 178 and 180, the opposite ends of which are interconnected via conductor 228. Pancake coil 154 has first and second straight through sections 182 and 188, a first looped section which includes inner and outer radial portions 184 and 186, the outer ends of which are interconnected via conductor 242, and a second looped section which includes inner and outer radial portions 190 and 192, the opposite ends of which are interconnected via conductor 222. Pancake coil 156 has first and second straight through sections 194 and 200, a first looped section which includes inner and outer radial portions 196 and 198, the opposite ends of which are interconnected via conductor 234, and a second looped section which includes inner and outer radial portions 202 and 204, the opposite ends of which are interconnected via conductor 214.

Winding 149, thus has four separate circuits, which will be called the A, B, C and D circuits, with the four circuits occupying different radial portions of each of the four pancake coils. For example, the A circuit may enter pancake coil 150 via conductor LA1 and proceed through the straight through section 164, starting at the inner turn AO and spiraling outwardly, appearing at every fourth turn until reaching turn A6, at which point it leaves pancake coil 150 and proceeds to pancake coil 152 via conductor 226, where it enters the inner turn of the second radial portion 180 in the fourth section, it spirals outwardly through this portion to its end at the end of turn A9, it returns to the inner end of its associated inner radial section 178, via conductor 228, and spirals outwardly to the end of turn A12. The A circuit then continues from pancake coil 152 to pancake coil 154 via conductor 230 and enters the start of the first, or straight through section 182, it spirals outwardly through this section to the end of turn A18, and proceeds to pancake coil 156 via conductor 232, and enters the inner end of the second radial portion 198 of the second section, it spirals outwardly through section 198 to the end of turn A21, and proceeds to the inner end of its associated inner radial section via conductor 234, and spirals outwardly through this section to the end of turn A24, where it leaves pancake coil 156 via conductor LA2. Thus, the A circuit proceeds through pancake coils 150, 152, 154 and 156 via the third, fourth, first, and second sections of these pancake coils, respectively, providing a complete transposition.

In like manner, the remaining B, C and D circuits follow alternate straight through and looped sections through the four pancake coils, with the B circuit proceeding through pancake coils 150, 152, 154 and 156, via the fourth, third, second and first sections, respectively. The C circuit proceeds through pancake coils 150, 152, 154 and 156 via the first, second, third and fourth sections, respectively. The D circuit proceeds through these pancake coils via the second, first, fourth and third sections.

Each pancake coil 150, 152, 154 and 156 is finish-center, center-start connected, and all pancake coils may be machine wound, providing automatic transpositions of the four circuits in four pancake coils. After the desired number of pancake coils are formed and interconnected, the four circuits are connected together at the start and finish of the winding, or winding section.

The basic mutually single interleaved, mixed type of winding structure shown in FIGS. 3, 4 and 5, in addition to providing all machine wound pancake coils which provide a transposition of the circuits from pancake coil to pancake coil, and which provides a minimum of stress between the conductor turns and between adjacent pancake coils due to oscillations which occur during surge potentials, also lends itself to a new and improved method of winding a complete winding assembly, or a winding section of a complete winding assembly, which requires only one brazed joint per pancake coil. The steps of this new method are schematically shown in FIGS. 10, 11, 12, 13 and 14, with the reference numerals used in FIGS. 3, 4 and 5 also being used in the figures which illustrate the various winding steps, to indicate like portions of the windings.

Figure 10:
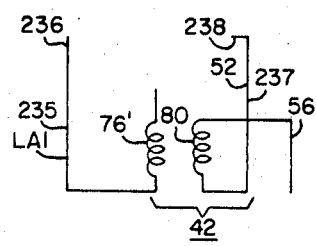
FIGS. 10, 11, 12, 13 and 14 are schematic diagrams representing the steps of a new winding method for constructing the two conductor, mutually single interleaved winding assembly shown in FIGS. 3, 4 and 5.
Figure 11:
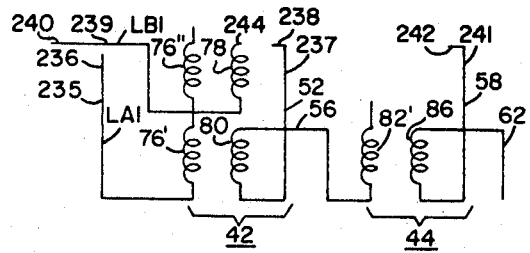

More specifically, as shown in FIG. 10, the new winding method comprises the steps of winding two conductive strands 235 and 237 radially together on a mandrel, which are from first and second reels of conductive material, to form the first half of the radial build of the pancake coil 42, with the first conductive strand 235 starting at end 236 to first form the lead LA1 before starting the radial winding operation. The second conductive strand 237 starts at end 238 to form the interleaving connection 52 before starting the radial winding operation. The two conductive strands 235 and 237 are then radially wound together, as shown in FIG. 3, to form sections 76' and 80. At the completion of these two sections, conductive strand 237 from section 80 is dropped to the mandrel to form the center-start connection 56. Then, as shown in FIG. 11, a conductive strand 239 from a third reel of conductor is introduced into pancake coil 42, starting at end 240 to form conductor or lead LB1, and then being introduced into pancake coil 42 where it radially interleaves conductive strand 235. However, before radially winding the second half of the radial build of pancake coil 42, a fourth conductive strand 241, from a fourth reel of conductive material, is introduced into pancake coil 44, immediately adjacent pancake coil 42. Conductive strand 241 starts at end 242 to first form interleaving connection 58 for pancake coil 44. Then, on the same mandrel that pancake coil 42 is being wound, conductive strands 237 and 241 are placed to start the first half of the radial build of pancake coil 44, which comprises sections 82' and 86. Then, while the second half of pancake coil 42 is being wound from conductive strands 235 and 239, from the first and third reels, forming sections 76" and 78, respectively, the first half of pancake coil 44 is also being simultaneously wound with conductive strands 237 and 231 from the second and fourth reels, respectively. The center-start connection 56 is thus continuous from pancake coil 42 to pancake coil 44. When the second half of pancake coil 42 is completed, which also completes the first half of pancake coil 44, conductive strand 239 is cut at 244, which end may be brazed or otherwise suitably attached to the end 238 of conductor 237, and conductive strand 241 is dropped to the mandrel to await the start of the first half of pancake coil 46.

Figure 12:
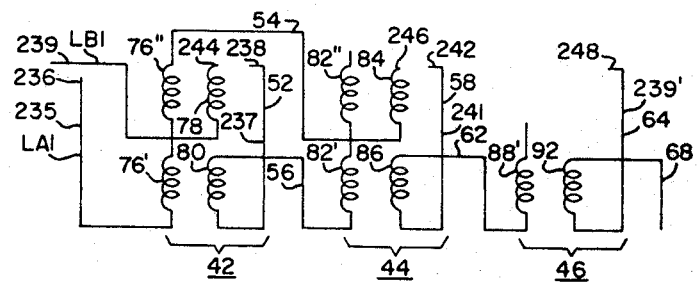

The next step, as shown in FIG. 12, continues conductive strand 235 from the first reel to pancake coil 44 to start its second radial section 84 with a continuous finish-center connection 54, starts the radial section 88' of the next adjacent pancake coil 46, using conductive strand 241 from the fourth reel, and starts section 92 of pancake coil 46 with conductive strand 239' from the third reel. Conductive strand 239' starts at end 248 and forms interleaving connection 64 before the radial winding operation starts. Then, while conductive strands 237 and 235 from the second and first reels, respectively, are being wound together to form sections 82" and 84 of pancake coil 44, conductive strands 241 and 239' from the fourth and third reels, respectively, are also being simultaneously wound on the same mandrel, to form sections 88' and 92, which form the first half of pancake coil 46. At this point, conductive strand 235 from reel 1 is severed for the first time at 246, and the end 246 of conductive strand 235 may be brazed to the end 242 of conductive strand 241.

Figure 13:
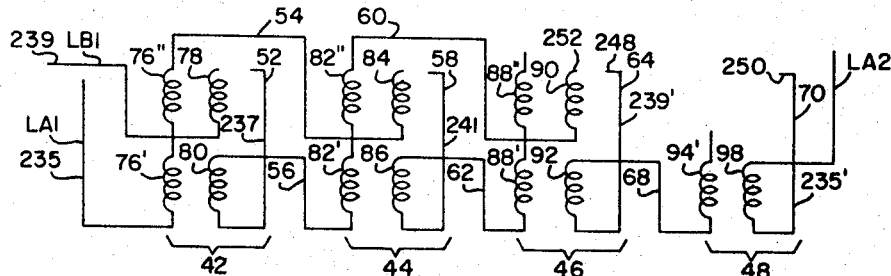

The next step, as shown in FIG. 13, continues conductive strand 237 from the second reel to start the outer radial portion 90 of pancake coil 46, forming a continuous finish-center connection 60, which conductor is radially interleaved with conductive strand 241 from the fourth reel to form section 88". While the second half of pancake coil 46 is being wound, the first half of pancake coil 48 is being simultaneously wound on the same mandrel with conductive strand 239' from the third reel, which forms a continuous center-start connection 68 from pancake coil 46, and with conductive strand 235' from the first reel. Conductive strand 235' starts at end 250 to form the interleaving connection 70, before the radial winding operation starts. After the second half of pancake coil 46 is wound and the first half of pancake coil 48, conductive strand 237 from the second reel is severed for the first time at 252, and end 252 may be brazed to end 248 of conductive strand 239'. Also, conductive strand 235' from the first reel, which formed section 98 of pancake coil 48, is either dropped to the mandrel to start the next adjacent pancake coil, or it forms conductor LA2, which will be subsequently brought to the outer surface of pancake coil 48 for connection to the B circuit conductor.

Figure 14:
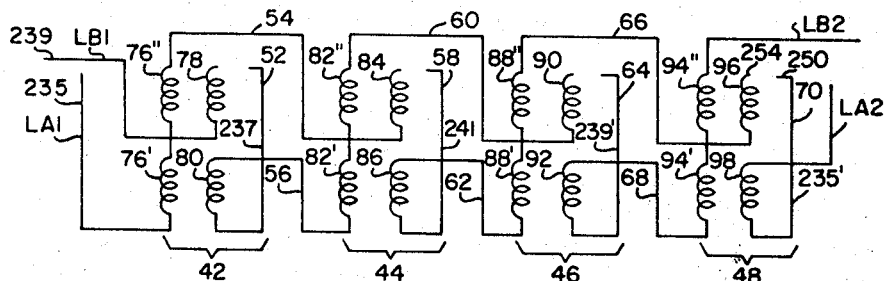

Assuming that pancake coil 48 is the last pancake coil of the winding, or of the winding section, it is completed, as shown in FIG. 14, by bringing conductive strand 241 from the fourth reel to pancake coil 48, forming a continuous finish-center connection 66, and radially winding it with conductive strand 239' from the third reel to form sections 96 and 94", respectively. Conductive strand 241 is then severed at 254, and end 254 may be brazed to end 250 of conductive strand 235'. Conductive strand 239' is continued to form conductor LB2, which may be brazed to the end 250 of conductor LA2. It will be noted that when following this winding method, the A circuit is constructed with conductors from the first and fourth reels, and the B circuit is constructed of conductors from the second and third reels.

Thus, the new two conductor, mutually single interleaved, mixed winding arrangement provides all machine wound sections, which allows a continuous winding method to be used which greatly facilitates the manufacturing of the winding, and it requires only one brazed connection per pancake coil which is located at the outer periphery of each pancake coil where the joint may be easily made. Further, the new method automatically transposes the positions of the A and B circuits from pancake coil to pancake coil, which reduces losses due to circulating currents, and it provides a winding structure which dampens voltage oscillations when the winding is subjected to surge potentials.

The two conductor, mutually single interleaved, mixed type winding structure, constructed according to the teachings of the invention, in addition to being used to construct a complete high voltage winding assembly for power transformers of the core-form type, may also be used to advantage with other types of interleaved high series capacitance winding structures. For example, because each circuit completes a pancake coil before proceeding to another pancake coil, its use in the tapped section of a complete winding structure, of winding structures which require tap connection points, is advantageous, as taps may be made on each pancake coil. Thus, in certain applications where it is desirable to utilize two conductor, mutually twin interleaved pancake coils in the main winding sections, the two conductor, mutually single interleaved, mixed winding may be used in the tapped sections, since the two conductor mutually twin interleaved winding only permits the tapping of alternate pancake coils. This example is shown in FIG. 15, which illustrates a complete high voltage winding assembly 260, which includes untapped sections 262 and 264, and a tapped section 266. The tapped section of a complete winding structure may appear at any desirable portion of the winding, with it being shown in the center of the winding in FIG. 15, for purposes of example.

Untapped section 262 of winding structure 260 in FIG. 15 includes a plurality of pancake coils, of which pancake coils 270, 272, 274 and 276 are shown, with the pancake coils of section 262 being of a two conductor, mutually twin interleaved, start-start connected type. Twin interleaving, as hereinbefore defined, refers to an interleaving arrangement in which the basic interleaving pattern requires two pancake coils, thus making it practical to provide tap connections only after the finish of each pair of coils. The two conductor, mutually twin interleaving arrangement disclosed in the hereinbefore mentioned U.S. Patent 3,260,978, has two straight-through radially interleaved sections in each pancake coil, such as sections 300 and 301 in pancake coil 270, sections 302 and 303 in pancake coil 272, sections 304 and 305 in pancake coil 274, and sections 306 and 307 in pancake coil 276. The main line conductor L1 is divided into A and B circuits, represented by conductors LA1 and LB1. The A circuit may enter the start or inner turn of section 300 in the first pancake coil 270, and spiral outwardly to end of this section, proceed to section 303 of pancake coil 272 via conductor 308, spiral inwardly through section 303 to the normal start or inner turn of this section, proceed to section 304 via conductor 309, entering section 304 at the end of its inner turn, and spiral outwardly to the end of the outer turn of this section, and proceed to section 307 of pancake coil 276 via conductor 310, where it enters the outer turn of this section and spirals inwardly to the start of its inner turn where it leaves via conductor 311. The B circuit enters the normal finish of section 302 of the second pancake coil 272, which is the end of the outermost turn of the section, and spirals inwardly to the normal start of this section, it proceeds to the first pancake coil 270 via conductor 312 and then enters the normal start of section 301, it spirals outwardly through this section, in the same direction in which the A circuit spiraled through the interleaved section 300, it leaves the end of the outer turn of section 301 and proceeds via conductor 313 to the normal finish end of section 306 in the fourth pancake coil 276, and spirals inwardly to the start of the inner turn of section 306, where it leaves this section via conductor 314 and enters the end of the inner turn of section 305 and spirals outwardly through this section, and leaves this section at the end of its outer turn via conductor 315. The A and B circuits may then enter the tapped section 266 of winding assembly 260, with a finish-center connection 315 from section 305 of pancake coil 274, and a start-start connection 311 from section 307 of pancake coil 276. Pancake coil 290 of tapped section 266 includes straight through section 316, and a looped section which includes inner and outer radial portions 318 and 317, which radial portions are interleaved with section 316. In like manner, pancake coil 292 includes a straight through section 319, and a looped section which includes inner and outer radial portions 321 and 320, respectively. Pancake coil 294 includes a straight through section 322 and a looped section which includes inner and outer radial portions 324 and 323, respectively; and, the fourth pancake coil 296 includes a straight through section 325, and a looped section which includes inner and outer radial portions 327 and 326, respectively. The outer end of the outer radial portion and the inner end of the inner radial portion in each pancake coil are interconnected with interleaving connections 362, 363, 364 and 365, respectively, in pancake coils 290, 292, 294 and 296. The start-start connection 311, which is in the A circuit, may enter the innermost turn of section 316 of pancake coil 290, leave the end of the outermost turn of section 316 and enter the inner turn of outer radial portion 320 with a finish-center connection 354, traverse the outer radial portion 320, proceed to the inner end of the inner radial portion 321 via interleaving connection 363, proceed to the innermost turn of section 322 of pancake coil 294, leave the outermost turn of this section and proceed to pancake coil 296 with a finish-center connection 356, enter the inner turn of the outer radial section 326 of pancake coil 296, proceed to the inner turn of the inner radial portion 327 via interconnection 365, and leave pancake coil 296 via conductor 357.

The finish-center connection 315, which is in the B circuit, may enter the inner turn of the outer radial section 317 of pancake coil 290, and traverse sections 317 and 318 of pancake coil 290, section 319 of pancake coil 292, portions 323 and 324 of pancake coil 294, and section 325 of pancake coil 296, leaving pancake coil 296 via electrical conductor 361.

Each of the pancake coils 290, 292, 294 and 296 may have tap connections 330, 332, 334, and 336, respectively, with the finish or outer end of straight through section 316 and the finish or outer end of the inner radial portion 318 of pancake coil 290 being brought to the outer periphery of this pancake coil and connected together to form tap 330. The remaining taps are formed in like manner.

At the completion of the tapped section 266 of winding 260, the A and B circuits proceed to untapped section 264 via conductors 357 and 361, respectively. Untapped section 264 is shown as a two conductor, mutually twin interleaved, finish-finish interconnected winding with pancake coil 280 having interleaved sections 340 and 341, pancake coil 282 having interleaved sections 342 and 343, pancake coil 284 having interleaved sections 344 and 345, and pancake coil 286 having interleaved sections 346 and 347. The A circuit enters the innermost turn of section 342 in pancake coil 282, it proceeds from the outermost turn of section 342 to the outermost turn of section 340 of pancake coil 280, via finish-finish connection 348, and then proceeds to the innermost turn of section 346 of pancake coil 286, via connection 349, it leaves the end of the outermost turn of section 346 and enters the end of the outermost turn of section 344 in pancake coil 284, and it leaves the end of the innermost turn of section 344 to form conductor LA2. The B circuit enters the outermost turn of section 341 of pancake coil 280, continues from the innermost turn of section 341 to the innermost turn of section 343 of pancake coil 282, via conductor 351, leaves the outermost turn of section 343 and enters the outermost turn of section 345 of pancake coil 284 via conductor 352, leaves the innermost turn of section 345 and enters the innermost turn of section 347 of pancake coil 286, via conductor 353, and forms conductor LB2 at the end of the outermost turn of section 347, which is connected with conductor LA2 to form the line conductor L2.

In making tap connections, and certain start and finish connections on any multiple conductor, interleaved type winding, where two or more conductors radially spaced apart in a pancake coil are to be connected in common, difficulty is often encountered in making the common connection within the space available, with the insulating of the leads and their common connection being especially troublesome. Examples of electrical windings of this nature are shown in FIGS. 1, 3, 6 and 8 of this specification, and in U.S. Patents 3,278,879 and 3,299,385, hereinbefore referred to, and in general, to any multiple conductor single and double interleaved, and mutually twin interleaved windings, where two or more distant conductors in a pancake coil are to be connected in common.

These problems may be greatly minified when following the teachings of another embodiment of the invention, exemplary forms of which are shown in FIGS. 16, 17, 17A, 18, 19, 20 and 21. While these figures illustrate this embodiment of the invention relative to a two conductor mutually single interleaved pancake coil, it will be apparent how the teachings may be applied to other types of interleaved winding structures.

In general, this embodiment of the invention teaches bringing all leads or taps to the outer periphery of the associated pancake coil, and connect them to conductors which are disposed on the outer periphery of the pancake coil, and which are mechanically a part of the coil build, although only electrically connected to the lead or tap brought out. Therefore, the common connection may be made in the same manner as if two adjacent outer turns of the pancake coil were to be electrically connected. This arrangement facilitates the construction of a mechanically strong electrical connection in a minimum of space, and allows the actual circumferential location of the common connection to be chosen by the coil designer. In some instances, the outer conductor to which the lead or tap is connected may actually be a continuation of the lead or tap which is brought out, and in other instances it may be a separate conductor, to which the lead or tap is brazed or otherwise electrically connected thereto.

More specifically, in making tap connections to the two conductor, mutually single interleaved winding, as well as making the initial and final connections to this type winding at the start and finish of the winding assembly, it is necessary in some instances to connect a centrally located conductor with a conductor on the outer periphery of the pancake coil, and in other instances to connect a conductor on the inner periphery of the pancake coil with a centrally located conductor. FIGS. 16 and 17 are schematic and side views of a two conductor, mutually single interleaved pancake coil 370 having a straight through A section 371 and B section which traverses an outer radial portion 372 and an inner radial portion 373, with the outer end of the outer radial portion and the inner end of the inner radial portion being interconnected by interleaving connections 374. FIGS. 16 and 17 illustrate how the first pancake coil of a winding assembly or winding section may be started, or how taps may be made to the pancake coil. For purposes of example it will be assumed that pancake coil 370 is the first pancake coil of a winding assembly, and that finish and center connections are to be made to straight through section 371 and the outer radial section 372, respectively.

In the machine winding of pancake coil 370, the conductive strand which starts section 371 is first measured to provide a suitable length before the radial winding operation starts, which length may be bent at 375, outwardly away from the major plane of the pancake coil, and upwardly into a plane parallel with the major plane of the pancake coil, which forms conductive portion 376, and is bent again at 377 back into the major plane of pancake coil 370. It follows the outer turn of pancake coil 370 for a predetermined distance, and is looped radially outward at 380 and brought back to the outer turn, and is then terminated at end 381. Suitable non-conductive binding means 382, such as glass tape, or cord, may then be wrapped about the coil build near the termination of the conductor, to firmly secure conductor LA to the pancake coil. Suitable inserts 383 and 384 of solid insulation, such as pressboard, may be placed adjacent the bends 375 and 377 to prevent abrasion between the bends and the adjacent conductor turns.

In like manner, the conductor which starts the outer radial section 372 is first measured to provide conductor LB, before being radially wound to form section 372, which conductor is of sufficient length to be bent outwardly away from the major plane of the pancake coil at bend 390, bent to proceed to the outer surface of the pancake coil 370 in a plane parallel to the major plane of the pancake coil, via conductor portion 391, bent at 392 back into the major plane of the pancake coil, and proceed along the top or outer periphery of pancake coil, resting on the LA conductor, until reaching loop 380. Upon reaching loop 380, the LB conductor is bent radially outward at 393, immediately adjacent the upwardly or outwardly extending loop portion 380 of the LA conductor, and is terminated at end 394. Suitable binding means 395 may then be wrapped about the coil build dimension, adjacent the upwardly extending portion 393 of the LB conductor, to securely hold both the LA and LB conductors. Suitable inserts 396, 397 and 398 of solid insulation may be placed on both sides of bend 390 and between bend 392 and the LA conductor to prevent abrasion between the bends and the adjacent conductor turns. The L conductor, shown in phantom, may then be easily secured to the LA and LB conductors, at the loop portion 380 of the LA conductor and the upwardly extending portion 393 of the LD conductor, by brazing, soldering, crimping, or any other suitable means. Thus, the LA conductor has first and second circumferentially spaced portions disposed adjacent the outer turn of the pancake coil, which spaced conductor portions are connected by a looped portion 380, which extends radially outward from the pancake coil. This LA conductor is then connected to the innermost turn of the pancake coil via a continuous electrical conductor 376. The LB conductor has a first portion which is disposed against a portion of the LA conductor and it has a second portion 393 which is bent outwardly from the pancake coil immediately adjacent the looped portion 380 of the first conductor. This arrangement forms a tap connection point which is easily accessible, which requires a minimum of space, and which is mechanically strong.

FIG. 17A is a fragmentary view of the pancake coil shown in FIG. 17, illustrating another arrangement for connecting the LA and LB conductors in common. In this example, the LA and LB conductors are not looped and bent outward, respectively, but they extend flat, superposed on one another, along the outer periphery of the pancake coil, terminating at substantially the same point. An electrical lead L may then be easily brazed to the LA and LB conductors, as shown at 385 and 387, respectively.

Instead of using the wire or conductor itself to form the connections from the inner turn, or from the centrally located turn of the pancake coil, to the outer periphery of the pancake coil, a preformed electrically conductive channel member may be used. This embodiment of the invention, shown in FIGS. 18, 19 and 20, illustrates connecting an outer conductor with a centrally disposed conductor, which may occur at a tap connection, or at the completion of the winding assembly. For purposes of example, it will be assumed that the connection in FIGS. 18, 19 and 20 is a tap connection T, on a pancake coil 400, shown schematically in FIG. 18, and in side and end views, respectively, in FIGS. 19 and 20. Pancake coil 400 is of the hereinbefore disclosed two conductor, mutually single interleaved type, having a straight through section 401 and a looped section which includes inner radial portion 402 and an outer radial portion 403. In this instance, conductor 405, which is the outer turn of the straight through section 401, is looped upwardly at 410, as it proceeds along the periphery of pancake coil 400 to the next adjacent pancake coil. Since conductor 407 is not being terminated, in this example, but is proceeding to the next adjacent pancake coil, it is not convenient to bend the wire itself outwardly to form the tap connection with the other circuit. Thus, a preformed U-shaped channel member 412, which is formed of an electrically conductive material, such as copper or aluminum, is used to electrically connect conductor 407 with another conductor 414. Conductor 414 is disposed at the outer periphery of the pancake coil, over conductor 405, and has a portion which is bent upwardly at 416, adjacent loop 410. Channel member 412 is brazed, or otherwise connected, to conductor 407 at 417, and brazed, or otherwise connected, to conductor 44 at 418. The tap connection T may thus be easily made to the upwardly extending portion 416 of conductor 414, and to the loop 410 formed by conductor 405, by brazing, soldering, crimping, or any other suitable fastening means. Conductors 414 and 405 may be mechanically secured, adjacent the tap connection T by binding means 419 and 420 disposed on both sides of the tap connection and wrapped about the complete coil build dimension. Solid insulating means 421 and 422 may be disposed on both sides of the connection of the channel member to conductor 407, and solid insulating means 423 may be disposed between conductor 414 and conductor 405 at the point where channel member 412 is secured thereto, to prevent the channel member from abrading the insulation on adjacent conductor turns. Other arrangements for connecting the two conductors 414 and 405 in common may of course be used. For example, the arrangement shown in FIG. 17A may be used by continuing conductor 405, without loop 410, and by placing conductor 414 directly on top of conductor 405, without the bend 416. A tap may then be brazed to both conductors, in the manner shown in FIG. 17A.

FIG. 21 is a side view of a pancake coil 430, illustrating a modification of the invention which may be used to further strengthen a tap connection, or a connection to the start or finish pancake coil of a complete winding assembly. Instead of both conductors which are to be interconnected proceeding from the same circumferential direction on the outer periphery of the pancake coil, one of the conductors may proceed in its normal position past the interconnection point, and then proceed to the outside periphery of the pancake coil, where it returns to the connection point from a circumferential direction which is opposite to that of the conductor it is to be connected with. Thus, each of the conductors to be connected together rest on the outer turn of the pancake coil, instead of one conductor resting on the other; and, with the two conductors approaching one another from opposite directions, the connection may be made mechanically stronger.

More specifically, as shown in FIG. 21, assume that a conductor A from the inner periphery of pancake coil 430 is to be connected to a conductor B from the central portion of the build of the pancake coil. The A conductor may be bent at 431 outwardly from the major plane of the pancake coil, and into a plane parallel with the pancake coil, and proceed via conductor 432 to the upper surface or outer periphery of the pancake coil where it is bent at 430 back into the major plane of the pancake coil. It then proceeds along the top turn of the pancake coil in a first predetermined direction, as indicated by arrow 442, and is terminated at 435 with an upward bent portion 434. Conductor B, which is to be joined to the A conductor, proceeds past the circumferential location of bent portion 434, for a predetermined distance, and is then connected, in this instance, to the lower end of a preformed U-shaped channel member 436, which has its upper end connected to a conductor 437. Conductor 437 proceeds along the outer periphery of pancake coil 430 in a direction opposite to that of arrow 442, as illustrated by arrow 444, and is terminated at 439 with an upward bent portion 438, which is disposed immediately adjacent the upward bent portion 434 of the A conductor. The two bent portions of the A and B conductors may then be joined with a suitable terminal 440, shown in phantom, which may be a tap connection, or the start of the winding.

Suitable binding means 446 and 448 may be disposed on each side of the bent portions 434 and 438 and wrapped securely around the coil build dimension to mechanically secure the A and B conductors and their common connection, and suitable inserts of solid insulation means, such as inserts 450, 451, 452, 453 and 454, may be disposed adjacent the various bends, to prevent short circuits between the bends and the adjacent conductor turns. Thus, each of the circuits to be joined have a first conductor portion disposed against the outer turn of the pancake coil, and each have a bent portion adjacent one another which is bent outwardly from the pancake coil and which is joined together. Other methods of connecting the two conductors disposed on the outer turn of the pancake coil in common may be used. For example, the two conductors may proceed towards each other, terminating immediately adjacent one another, without the bends. A lead wide enough to be brazed to both conductors may then be used to make the common connection.

Thus, in this embodiment of the invention distant conductors are connected in common by first bringing the conductors to the outer periphery of the associated pancake coil, and running the conductors along the outer periphery, in the same circumferential direction, or in opposite directions. The conductors may be brought to the outer periphery of the pancake coil by either continuing the wire of the coil turn, by bending it as shown in FIG. 17, or by separate radial connections, as shown in FIGS. 19 and 21.

In the formation of a complete winding assembly, such as winding assembly 260 shown in FIG. 15, the pancake coils, after winding, are usually pressed together to provide the desired duct width between adjacent pancake coils, and the desired dimensions of the complete winding structure. When all of the pancakes are interconnected, such as in section 266 of winding assembly 260, whereby the only interconnections are between adjacent pancake coils, little difficulty is encountered. However, when twin interleaving is involved, such as in the start-start interleaved section 262, and in the finish-finish interleaved section 264, whereby connections must be made between distant pancake coils, separated by one or more pancake coils, the relatively long interconnecting lead is deformed by the pressing operation and it may subsequently cause a short circuit by contacting and abrading the conductor turns in the intervening pancake coils. For example, in the start-start interleaved winding section 262 of FIG. 15, connection 313 between sections 301 and 306 of pancake coils 270 and 276 must cross pancake coils 272 and 274. The problem does not appear to be critical when the long lead is a finish-finish connection, such as lead 313, as it could be connected after the pressing operation. However, it is not always convenient to make the connection after pressing, as it requires extra space in order to make the necessary brazed joints above the surface of the coil; and, when the pancake coil is part of an inside winding, such as in the inner leg of a polyphase transformer, it would not be desirable to provide this extra space as it would have to be added in addition to the required axial electrical clearance between the inner winding and the outer windings. Further, the deformation of this long interconnecting lead provides a very critical problem when it is between the starts of distant pancake coils, such as the start-start connection 349 between pancake coils 280 and 286 of winding group 264 shown in FIG. 15. In this instance, this connection must be made before the pressing operation.

The deformation of interconnecting leads between distant pancake coils is also a problem in mutually twin interleaved winding structures having two conductors, in which the sequence of one conductor in each group of four pancake coils is 1, 2, 4 and 3, and the sequence of the other conductor is 2, 1, 3 and 4, such as shown in the hereinbefore mentioned U.S. Patent 3,260,978. In this winding structure, certain interconnecting leads must pass over one intervening pancake coil, and contains both start-start, and finish-finish interconnections, which pass adjacent the inner and outer peripheries of the pancake coils, respectively. This type of winding structure has lower electrical stresses between each pair of pancake coils, and is often used at the line end of a winding structure, with the remainder of the winding using mutually twin finish-finish interleaved sections, such as section 264 in FIG. 15.

The deformation problem is also encountered when using three or more conductors in mutually twin-type interleaved winding structures, and in general, in any winding structure which includes a plurality of pancake coils, with interconnections between pancake coils which must cross one or more intervening pancake coils.

Figure 24:
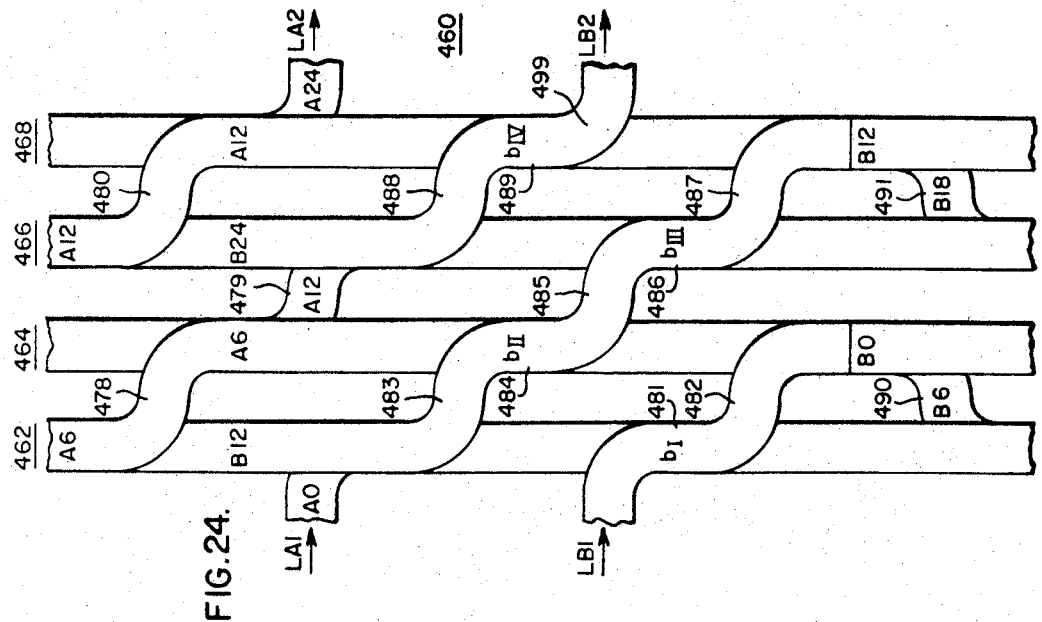
FIGS. 22, 23 and 24 are schematic, diagrammatic and edge views, respectively, illustrating electrical connections between pancake coils, separated by one or more intervening pancake coils, formed according to the teachings of the invention.
Figure 22:
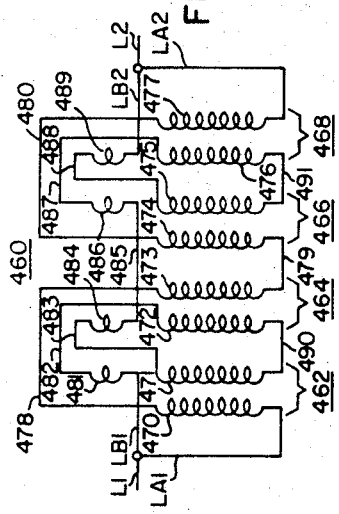
Figure 23:
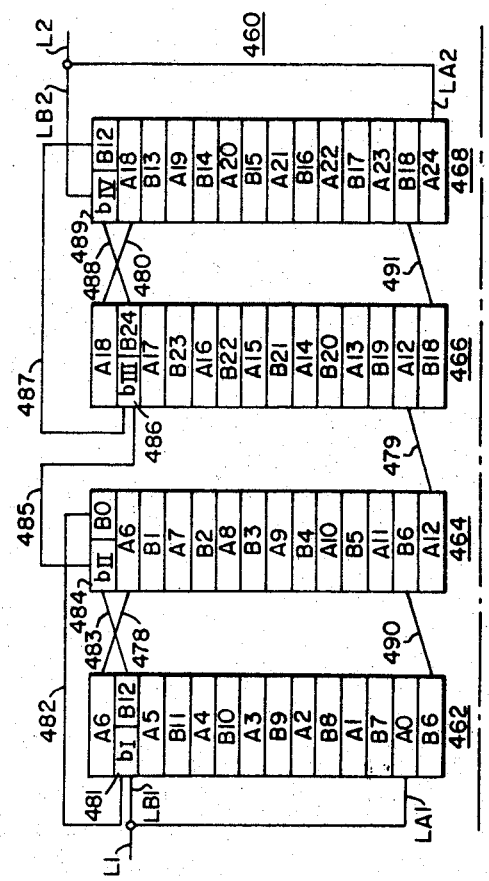

The embodiment of the invention shown in FIGS. 22, 23 and 24 is exemplary of how start-start and finsh-finish connections may be made between distant pancake coils separated by one or more pancake coils, without requiring extra space, and without the danger of unduly deforming the interconnection. Broadly, this embodiment of the invention consists of bending the interconnecting lead to enter a plane of the first intervening pancake coil, with a short interconnecting bend similar to those used to electrically connect adjacent pancake coils. However, instead of being electrically connected to this first adjacent coil, it merely runs for a predetermined short distance along the inner or outer turn of this pancake, depending upon whether the long lead is a start-start or a finish-finish connection. After a predetermined distance, the interconnecting lead is bent to enter the plane of the next intervening pancake coil, again with a short bend of the type used to electrically connect adjacent pancake coils. The interconnecting conductor follows this new pancake coil for a predetermined short distance, and is again bent to enter the plane of the next intervening pancake coil. This procedure is followed until reaching the pancake it is to be electrically connected to. Thus, the lead mechanically becomes a portion of each intervening pancake coil, forming a fractional or partial turn therewith, without actually being electrically connected thereto, and without adding to the effective winding turns used for transforming the voltage. Therefore, when the pancake coils are pressed, the long interconnecting lead acts just like the short electrical connections between adjacent pancake coils, deforming only to this same slight extent. It is important that the interconnection lead only form a partial turn in the intervening coils. For example, 15 degrees of a full 360 degree turn. If one or more turns are added they will affect the transformation ratio, and may also eliminate the transposition of the circuits between pancake coils.

More specifically, FIG. 22 is a schematic diagram of a winding assembly 460, which is formed in a manner similar to the winding group 262 of FIG. 15, using a two conductor, mutually twin interleaved winding arrangement. Winding assembly 460 is shown diagrammatically in FIG. 23, and FIG. 24 is a plan view of the structure shown in FIG. 23.

Winding assembly 460, which in this instance is shown with four pancake coils 462, 464, 466 and 468, is of the type which has two interleaved sections per pancake coil. Pancake coil 462 has interleaved sections 470 and 471, pancake coil 464 has interleaved sections 472 and 473, pancake coil 466 has interleaved sections 474 and 75, and pancake coil 68 has interleaved sections 476 and 477. The A circuit enters the inner turn of section 470 of pancake coil 462 via conductor LA1, it spirals outwardly, interleaved with the B circuit, until reaching the end of the outer turn of section 470, it proceeds to the end of the outer turn of section 473 of pancake coil 464, via finish-finish connection 478, it spirals inwardly to the start of the inner turn of section 473 and proceeds to the start of the inner turn of section 474 of pancake coil 466, via start-start connection 479, it leaves the end of the outer turn of section 474 and enters the end of the outer turn of section 477 of pancake coil 468, via finish-finish connection 480, and it leaves the end of the inner turn of sections 477 via connection LA2.

The B circuit must cross pancake coil 462, as it starts at the finish end of pancake coil 464. Thus, according to the teachings of the invention, conductor LB1 is bent into the plane of the first pancake coil, as shown most clearly in FIG. 24, and forms a partial turn $b_I$, indicated at 481. It will be noted from the schematic diagram shown in FIG. 22 that the partial turn is not electrically connected to pancake coil 462. At the end of this partial turn, it is bent at 482 to enter pancake coil 467, where it is electrically connected to the finish end of section 472. After spiraling inwardly through section 472, it is connected to section 471 of pancake coil 462 via start-start connection 490, and the B circuit traverses section 471 to its finish end. The next electrical connection for the B circuit is in pancake coil 468, with pancake coils 464 and 466 being disposed between the two electrical connection points. Thus, the B circuit is first bent at 483 to enter the plane of pancake coil 464 and form a partial turn $b_{II}$, shown at 484. At the end of partial turn $b_{II}$, the B conductor is bent at 485 to enter the plane of pancake coil 466 with a partial turn $b_{III}$, shown at 486. After completing partial turn $b_{III}$, the B conductor is bent at 487 to enter pancake coil 468, where it is electrically connected to the finish end of section 476. After spiraling inwardly through section 476, the B circuit continues to the end of the inner turn of section 475 of pancake coil 466 via conductor 491, and it spirals outwardly through section 475 to the end of the outer turn. The B circuit must now mechanically cross pancake coil 468 and, according to the teachings of the invention, it is bent at 488 into the plane of pancake coil 468, to form partial $b_{IV}$, and after completing this partial turn it is bent at 499 and becomes conductor LB2.

If winding section 264 of FIG. 15 were to be constructed according to the teachings of the invention, FIG. 24 would be a bottom edge view of this winding section instead of the top edge or plan view, but otherwise the procedure would be similar. Thus, the teachings of this embodiment of the invention may be advantageously utilized for making electrical connections between distant pancake coils, which are separated by one or more pancake coils, with the interconnecting conductor being mechanically associated with each intervening pancake coil for a partial turn therein, following either the inner or outer turn of the intervening pancake coils, without actually being electrically connected thereto. As shown in FIG. 23, the transportation of the A and B circuits from pancake coil to pancake coil has not been effected by the disclosed arrangement.

When the current requirements of a winding become such that three parallel circuits, and sometimes four, or more, are required in a winding structure, the two conductor high series capacitance structures taught herein may be expanded to four conductor structures, such as shown in FIGS. 8 and 9. However, in some instances it would only be desirable to go to a three conductor structure, having three parallel circuits, instead of four, if this could be accomplished symmetrically, and it would be desirable to construct the three conductor winding assembly by physically winding only two conductive strands together at any one time. Further, when a four conductor or a four circuit winding is required, it would also be desirable to construct this winding by only winding two conductive strands together at any one time, instead of four as required in the structures shown in FIGS. 8 and 9. Further, the resulting structures should preferably transpose the relative positions of the multiple circuits, in order to minify losses due to circulating currents.

FIGS. 25 and 26 are schematic and diagrammatic views, respectively, of a winding structure 500 which utilizes three conductive strands per pancake coil, only two of which need be wound together at any one time in normal winding practice, which structure has three parallel circuits, is symmetrical, has only one top-to-bottom interleaving connection per pancake coil, and which transposes the relative positions of the circuits from pancake coil to pancake coil. Also, the circuits or electrical paths are connected to different radial portions as they enter each pancake coil, to radially stagger the locations of the conductors entering each pancake coil.

More specifically, winding structure 500 requires three pancake coils 501, 502 and 503 to complete a basic interleaving pattern, with as many additional pancake coils being used as required by the application. Each pancake coil has three circuits, which will be called the A, B and C circuits, and the pancake coils are interconnected to provide three separate parallel circuits through the winding assembly. Assuming that pancake coil 501 is connected to the line terminal L, it has three conductive strands LA1, LB1, and LC1 which are connected in common and to the line terminal L. At the finish end of the winding, or winding section, the three conductors would again be connected in common, to complete the parallel connection. The three conductors would also be connected in common at any tap connection point, and the teachings hereinbefore set forth relative to the making of tap connections, as well as to the making of start and finish connections, may be applied to the three and four conductor winding structures to be hereinafter described.

Pancake coils 501, 502, and 503 are all constructed in like manner, and since they are symmetrical about center line 532 in FIG. 26, only half of the pancake coils are shown in the figures.

Each pancake coil has only two circuits interleaved together at any one time. Each pancake coil may thus be thought of as having two interleaved sections, I and II, with each section having first, second and third radial portions, and with each radial portion having an inner or "start" end, and an outer or "finish" end, referenced radially outward from center line 532. Thus, the first section of pancake coil 501 includes first, second and third radial portions 504, 505 and 506, respectively, and its second section has first, second and third radial portions 507, 508 and 509, respectively. In like manner, pancake coil 502 has a first section which has first, second and third radial portions 510, 511 and 512, respectively, and a second section which has first, second and third radial portions 513, 514 and 515, respectively; and, pancake coil 503 has a first section which includes first, second and third radial portions 516, 517 and 518, respectively, and a second section which includes first, second and third radial portions 519, 520 and 521, respectively. Although the pancake coils are not usually wound in this manner, each pancake coil may be visualized as being spirally wound from two conductors, which are subsequently each severed twice to form three substantially equal radial portions.

Each pancake coil has the outer or finish end of the third radial portion of one of its sections, connected to the inner or start end of the first radial portion of the other section. This leaves two radial portions in each section, with the remaining two radial portions in the first section being connected together, and the remaining two radial portions in the second section being connected together. Thus, in pancake coil 501, the outer end of the third radial portion 506 may be connected to the inner end of the first radial portion 507, which is in the other section, via conductor 522. Similar connections are made in pancake coils 502 and 503 via conductors 523 and 524, respectively. The remaining two radial portions in the first section are interconnected, from the outer end of the first radial portion 504, to the inner end of the second radial portion 505; and, the remaining two radial portions in the second section are interconnected, from the outer end of the second radial portion 508, to the inner end of the third radial portion 509. Similar connections are made in pancake coils 502 and 503.

The A, B and C circuits enter pancake coil 501 at the inner end of the first radial portion 504, at the inner end of the second radial portion 508, and at the inner end of the third radial portion 506, via conductors LA1, LB1, and LC1, respectively. The A, B and C circuits leave pancake coil 501 from the outer end of the second radial portion 505, from the outer end of the third radial portion 509, and from the outer end of the first radial portion 507, respectively.

In interconnecting the pancake coils, all of which have entrances and exits in the same locations as those described in pancake coil 501, the outer end of the third radial portion of the second section is always connected to the inner end of the first radial portion of the first section, in the next adjacent pancake coil, the outer end of the first radial portion of the second section is always connected to the inner end of the second radial portion of the second section of the next adjacent pancake coil, and the outer end of the second radial portion of the first section is always connected to the inner end of the third radial portion of the first section of the next adjacent pancake coil. Thus, all of the interconnections between pancake coils are finish-start connections, with two of the connections being short connections which connect adjacent points in adjacent pancake coils, and one of the connections being a top-to-bottom connection.

More specifically, pancake coil 501 is connected to pancake coil 502 from the outer end of the first radial portion 507 to the inner end of the second radial portion 514, via conductor 526; from the outer end of the second radial portion 505 to the inner end of the third radial portion 512 via conductor 528; and, from the outer end of the third radial portion 509 to the inner end of the first radial portion 510, via conductor 530. Conductors 527, 529 and 531 connect similar radial portions of pancake coils 502 and 503.

Each circuit occupies the position of each of the other circuits after completing three pancake coils, resulting in a complete transposition of the circuits. The A circuit traverses the first and second radial portions of the first section of pancake coil 501, the third and first radial portions of the first and second sections in pancake coil 502, and the second and third radial portions of the second section of pancake coil 503.

The B circuit traverses the second and third radial portions of the second section of pancake coil 501, the first and second radial portions of the first section of pancake coil 502, and the third and first radial portions of the first and second sections, respectively, of pancake coil 503.

The C circuit traverses the third and first radial portions of the first and second sections respectively, of pancake coil 501, the second and third radial portions of the second section of pancake coil 502, and the first and second radial portions of the first section of pancake coil 503.

While there are three separate circuits in each pancake coil, only two conductive strands need be wound together at any one time. For example, in pancake coil 501, the A and C conductive strands are wound together for the first one third of the coil build, the A and B conductive strands are wound together for the next one third of the coil build, and the B and C conductive strands are wound together for the last one third of the coil build dimension.

As shown in FIG. 26, in which the coil turns of the A, B and C circuits are each numbered consecutively, starting at their entry into the pancake coil, there is an A, B and C circuit at each like turn in the three pancake coils. Further, the interleaving of the three circuits in each pancake coil has been accomplished in a symmetrical manner, with each pancake coil being similar to all other pancake coils, with only three interconnecting leads between adjacent pancake coils, and with only one interleaving connection in each pancake coil.

FIGS. 27 and 28 are schematic and diagrammatic views, respectively, of pancake coils 501, 502 and 503 shown in FIGS. 25 and 26, but they are interconnected according to another embodiment of the invention. Since the pancake coils per se are physically the same as in FIGS. 25 and 26, the same reference numerals are used to indicate like components. The reference numerals on the winding structures and on the interconnecting conductors between the pancake coils are different, however, as the pancake coils are interconnected differently.

More specifically each free or unconnected outer end of the radial portions in each pancake coil of winding assembly 540 in FIGS. 27 and 28 is connected to the inner end of the same numbered radial portion of the opposite section in the next adjacent pancake coil. For example, the outer end of the first radial portion of the second section in each pancake coil is connected to the inner end of the first radial portion of the first section in the next adjacent pancake coil, the outer end of the second radial portion of the first section in each pancake coil is connected to the inner end of the second radial portion of the second section of the next adjacent pancake coil, and the outer end of the third radial portion of the second section of each pancake coil is connected to the inner end of the third radial portion of the first section in the next adjacent pancake coil. Thus, portion 507 of pancake coil 501 is connected to portion 510 of pancake coil 502 via conductor 534, portion 505 is connected to portion 514 via conductor 535, and portion 509 is connected to portion 512 via conductor 536. Further, portion 513 of pancake coil 502 is connected to portion 516 of pancake coil 503 via conductor 537, portion 511 is connected to portion 520 via conductor 538, and portion 515 is connected to portion 518 via conductor 539.

Although the pancake coils shown in FIGS. 27 and 28 are connected in a different manner from those shown in FIGS. 25 and 26, the resulting winding structure 540 possesses the same advantages as winding 500. It has three separate parallel circuits, each pancake coil is similar to all of the other pancake coils, the winding and its interconnections are symmetrical, and each circuit occupies the positions of the other circuits, after completing three pancake coils, resulting in a transposition of the circuits. Further, only two conductive strands need be wound together at any one time while winding each pancake coil.

FIGS. 29 and 30 are schematic and diagrammatic views, respectively, of a winding assembly 550 which illustrates how the teachings of FIGS. 27 and 28 may be extended to a four circuit winding, while retaining all of the advantages of the three conductor winding 540.

Winding structure 550 requires four pancake coils 551, 552, 553 and 554 to complete a basic interleaving arrangement, with as many additional pancake coils being used as required by the particular application. Each pancake coil has four circuits, which will be called A, B, C and D circuits, and the pancake coils are interconnected using the same basic teaching disclosed relative to FIGS. 27 and 28.

The pancake coils of winding 50 each have two sections I and II, with each section having first, second, third and fourth radial portions, each having inner and outer ends, referenced from center line 603. The outer end of the first radial portion of the first section is connected to the inner end of the second radial portion of the first section in each of the pancake coils, and the outer end of the third radial portion of the first section is connected to the inner end of the fourth radial portion of the first section in all of the pancake coils. The outer end of the second radial portion of the second section is connected to the inner end of the third radial portion of the second section, in all of the pancake coils; and, the outer end of the fourth radial portion of the second section is connected to the inner end of the first radial portion of the second section, via conductors 587, 588, 589 and 590 in pancake coils 551, 552, 553 and 554, respectively.

The A circuit, via conductor LA1 is connected to the inner end of the first radial portion 555 of the first section of pancake coil 551, the B circuit, via conductor LB1 is connected to the inner end of the second radial portion 560 of the second section, the C circuit, via conductor LC1 is connected to the inner end of the third radial portion 557 of the first section, and the D circuit, via conductor LD1 is connected to the inner end of the fourth radial portion 562 of the second section.

The pancake coils are interconnected by connecting the unconnected outer ends of the radial portions of each pancake coil with the unconnected inner ends of the same numbered radial portion of the opposite section, in the next adjacent pancake coil. Thus, the outer end of the first radial portion of the second section is connected to the inner end of the first radial portion of the first section of the next adjacent pancake coil. This connects radial portion 559 with radial portion 563 via conductor 591, radial portions 567 and 571 via conductor 595, and radial portions 575 and 579 via conductor 599.

Next, the outer end of the second radial portion of the first section is connected to the inner end of the second radial portion of the second section in the next adjacent pancake coil. This connects portions 556 and 568 via conductor 592, portions 564 and 576 via conductor 596, and portions 572 and 584 via conductor 600.

Next, the outer end of the third radial portion of the second section is connected to the inner end of the third radial portion of the first section of the next adjacent pancake coil. This connects portions 561 and 565 via conductor 593, portions 569 and 573 via conductor 597, and portions 577 and 581 via conductor 601.

Next, the outer end of the fourth radial portion of the first section is connected to the inner end of the fourth radial portion of the second section of the next adjacent pancake coil. This connects portions 558 and 570 via conductor 594, portions 566 and 578 via conductor 598, and portions 574 and 586 via conductor 602.

Thus, each circuit occupies the positions of all of the other circuits after completing four pancake coils, resulting in a transposition of the circuits. As shown in FIG. 30 in which each turn of the four circuits is numbered consecutively from the time of its first entry into pancake coil 551, like radial turns in each pancake coil are from a different circuit in each pancake coil. Since the pancake coils and their interconnections are similar, a symmetrical winding structure is produced which has only one interleaving connection, and four connections between adjacent pancake coils. Although there are four separate circuits in each pancake coil, each coil may be wound by winding only two conductors together at any one time. Also, since all of the connections between pancake coils are finish-start connections, the coils may all be of the machine wound type, with the circuits all spiraling radially outward.

FIG. 31 is a schematic diagram of pancake coils 501, 502 and 503 shown in FIGS. 24 and 26, but they are interconnected according to still another embodiment of the invention. Since the pancake coils per se are physically the same as those in FIGS. 25 and 26, the same reference numerals are used to indicate like components. The reference numerals on the winding structure and on the interconnecting conductors between the pancake coils are different, however, as the pancake coils are interconnected differently.

More specifically, in this embodiment of the invention, alternate adjacent pairs of pancake coils are connected with start-start connections, and the remaining pairs of pancake coils are connected with finish-finish connections. The three circuits are connected to the line terminal L, and the A circuit enters the outer or finish end of radial section 509 of the second section of pancake coil 501 via conductor LA1, the B conductor enters the second radial portion of the first section of pancake coil 501 via conductor LB1, and the C circuit enters the outer end of the first radial portion of the second section of pancake coil 501, via conductor LC1. The A circuit proceeds from pancake coil 501 to pancake coil 502 via conductor 636, which interconnects the inner end of the second radial portion 508 of the first section of pancake coil 501, with the inner end of the second radial portion 514 of the second section of pancake coil 502. The B circuit proceeds from pancake coil 501 to pancake coil 502 via conductor 635, which interconnects radial portions 504 and 510, and the C circuit proceeds from pancake coil 501 to pancake coil 502 via conductor 637, which interconnects portions 506 and 512.

The A circuit proceeds from pancake coil 502 to pancake coil 503 via conductor 640 which interconnects the outer ends of portions 515 and 521, the C circuit proceeds from pancake coil 502 to pancake coil 503 via conductor 639, which interconnects the outer ends of radial portions 511 and 517, and the C circuit proceeds from pancake coil 502 to pancake coil 503 via conductor 638, which interconnects the outer ends of radial portions 513 and 519. Pancake coil 503 is then connected to the next adjacent pancake coil with start-start connections, and at the end of the winding the A, B and C conductors are connected in common.

The winding assembly shown in FIG. 31, has the disadvantage of not completely transposing the A, B and C circuits, such as those described in FIGS. 25, 26, 27, 28, 29 and 30. Therefore, this winding will have a limited application.

While FIGS. 25–31 have three or four parallel connected conductors, it will be obvious that the teachings of this embodiment of the invention may be extended to any number of conductors connected in parallel, and also extended to any higher order of multiple interleaving.

FIGS. 32 and 33, and 34 and 35, illustrate winding assemblies constructed according to embodiments of the invention which have three and four circuits, respectively, while each pancake coil in the winding assemblies only has two circuits.

More specifically, FIGS. 32 and 33 illustrates schematic and diagrammatic views of a winding assembly 670 having three parallel circuits, which requires six pancake coils 641, 642, 643, 644, 645 and 646 to complete a basic interleaving arrangement. Each pancake coil has two interleaved sections, with each section completely radially traversing each pancake coil, and each section has inner or start ends and outer or finish ends, relative to center line 668. Pancake coil 641 has sections 647 and 648, pancake coil 642 has sections 649 and 650, pancake coil 643 has sections 651 and 652, pancake coil 644 has sections 653 and 654, pancake coil 645 has sections 655 and 656, and pancake coil 646 has sections 657 and 658.

The first parallel circuit, which will be called the A circuit, enters the finish end of the first section 647 of the line end pancake coil 641 via conductor LA1, and spirals inwardly, appearing at every other turn, until reaching the "start" end of this section. The A circuit then proceeds via conductor 659 to the next or second pancake coil 642, and enters the "start" end of the second section 650, which transposes the position of the A circuit in pancake coils 641 and 642, and spirals outwardly to the "finish" end of the section, proceeds via conductor 660 to the "finish" end of the first section 655 in the fifth pancake coil 645, leaves the "start" end of this section and proceeds via conductor 661 to the "start" end of the second section 654 of the fourth pancake coil 644, and leaves the "finish" end of this section via conductor LA2.

The B circuit enters the "start" end of the first section 649 of the second pancake coil 642, leaves the "finish" end of this section via conductor 662 and enters the "finish" end of the second section 652 of the third pancake coil 643, leaves the "start" end of this section via conductor 663 and enters the "start" end of the first section 657 of the sixth pancake coil 646, leaves the "finish" end of this section and proceeds via conductor 664 to the "finish" end of the second section 656 of the fifth pancake coil 645, and leaves the "start" end of this section via conductor LB2.

The C circuit enters the "finish" end of the first section 651 of the third pancake coil 643 via conductor LC1, leaves the "start" end of this section via conductor 665 and enters the "finish" end of the second section 648 of the first pancake coil, leaves the "start" end of this section via conductor 666 and enters the "start" end of the first section 653 of the fourth pancake coil 644, and leaves the "finish" end of this section via conductor 667 and enters the "start" end of the second section 658 of the sixth pancake coil 653, leaving this section via conductor LC2.

Therefore, while winding assembly 670 has three separate parallel circuits, the pancake coils have only two radially interleaved sections, thus facilitating the construction of winding assembly 670. The connections between distant pancake coils in winding assembly 670 may be successively bent into the planes of the intervening pancake coils to form fractional turns therewith, as hereinbefore described.

As shown by the arrows in FIG. 32, the radial direction of the spiraling turns is opposite in adjacent pancake coils. Thus, all of the pancake coils in which the circuit first enters the outer end of a section, must be collapsed after machine winding and rewound by hand.

FIGS. 34 and 35 are schematic and diagrammatic views, respectively, of a winding assembly 695 having four parallel circuits, while the individual pancake coils only have two circuits. Winding assembly 695 requires four pancake coils 675, 676, 677 and 678 to complete a basic interleaving arrangement. Each pancake coil has two sections I and II, which are continuous, extending from the inner or "start" ends to the outer or "finish" ends, relative to center line 691, shown in FIG. 35. Pancake coil 675 has first and second sections 679 and 680, pancake coil 676 has first and second sections 681 and 682, pancake coil 677 has first and second sections 683 and 684, and pancake coil 678 has first and second sections 685 and 686.

The first or A circuit enters the "finish" end of the first sections 679 of the first pancake 675 via conductor LA1, leaves the "start" end of this section via conductor 687 and enters the "start" end of the second section 682 of the second pancake coil 676, and leaves the "finish" end of this section via conductor LA2.

The second or B circuit enters the "start" end of the first section 681 of the second pancake coil 676 via conductor LB1, leaves the "finish" end of this section via conductor 688, enters the "finish" end of the second section 684 of the third pancake coil 677, and leaves the "start" end of this section via conductor LB2.

The third or C circuit enters the "finish" end of the first section 683 of the third pancake coil 677 via conductor LC1, leaves the "start" end of this section via conductor 689 and enters the "start" end of the second section 686 of pancake coil 678, and leaves the "finish" end of this section via conductor LC2.

The fourth or D circuit enters the "start" end of the first section 685 of the fourth pancake coil 678, leaves the "finish" end of this section via conductor 690 and enters the "finish" end of this second section 680 of the first pancake coil 675, and leaves the "start" end of this section via conductor LD2.

Conductors LA1, LB1, LC1, and LD1 may be connected to the line terminal L, and conductors LA2, LB2, LC2, and LD2 may be connected in common to complete the parallel connection of the circuits, or they may be connected to additional pancake coils.

Winding assembly 695, therefore, has four parallel circuits, while each pancake coil has only two interleaved circuits.

While FIGS. 32–35 show three and four parallel connected conductors, it will be obvious that the teachings of the embodiment of the invention may be extended to any number of parallel connected conductors, while having only two interleaved circuits in each pancake coil. Further, the two interleaved circuits in each pancake coil may be interleaved in higher ordered multiple interleaving arrangements.

Thus, in summary, a first embodiment of the invention discloses how to perform a transposition between two machine wound type pancake coils which are of the two conductor, mutually single interleaved high series capacitance type, and which are interconnected by finish-start, center-center connections. The transposition is accomplished by alternating the relative circumferential positions of the interleaving connection and the finish-start connection of two adjacent pancake coils, when a transposition of the two circuits through the pancake coils is desired.

Another embodiment of the invention teaches a new interconnecting arrangement for a two conductor, mutually single interleaved pancake coil, whereby adjacent pancake coils are finish-center, center-start connected, which "mixes" the positions of the A and B circuits from pancake coil to pancake coil. This mixing automatically provides a transposition of the circuits from pancake coil to pancake coil while using all pancake coils of the machine wound type.

Also disclosed are embodiments of the basic two conductor, mutually single interleaved mixed winding arrangement extended to multiple interleavings per pancake coil, and to any number of even numbered conductors.

This new type of two conductor, mutually single interleaved mixed winding lends itself to a new and improved winding method, in which the second half of one pancake coil is wound simultaneously with the first half of the next adjacent pancake coil, with four reels of wire, which requires only one brazed joint, located adjacent the outside surface of each pancake coil.

New and improved arrangements for bringing out taps from multi-conductor, interleaved windings are disclosed, as well as new and improved structures for interconnecting the conductors at the start and finish ends of the winding structure.

Also disclosed is a new structural arrangement for electrically interconnecting distant pancake coils, which are separated by one or more pancake coils, which structure does not require extra space for brazing the interconnecting leads together, and which eliminates the danger of deforming the lead and moving it into the intervening pancake coils while pressing the stack of pancake coils to the desired dimensions.

Still other embodiments of the invention disclose three and four parallel circuit winding constructions, which require only two conductors to be wound together at any one time, which provide transpositions of the circuits, and which provide symmetrical assemblies.

Since numerous changes may be made in the above described apparatus and different embodiments of the invention may be made without departing from the spirit thereof, it is intended that all matter contained in the foregoing description or shown in the accompanying drawings, shall be interpreted as illustrative and not in a limiting sense.

I claim as my invention:

1. An interleaved turn winding for electrical inductive apparatus comprising:
  a plurality of pancake coils disposed in spaced side-by-side relation,
  each of said pancake coils including at least first and second insulated electrically conductive strands spirally wound together to provide first and second radially interleaved sections having start and finish ends,
  first means connecting the finish end of the first section of each pancake coil with the start end of the first section of the next adjacent pancake coil, to provide a first series path through the winding having first and second ends,
  the second section of each of said pancake coils being severed at substantially its midpoint to provide first and second radial portions in each pancake coil which have inner and outer radially disposed ends, second means connecting the start and finish ends of the second section together in each of said pancake coils, and third means interconnecting the outer end of the first radial portion of the second section of each pancake coil with the inner end of the second radial portion of the second section of the next adjacent pancake coil, to provide a second series path through the winding having first and second ends, the circumferential locations at which said first and second means enter the pancake coils at the start ends of said first and second sections being spaced, with their locations relative to one another being reversed in at least two adjacent pancake coils, to transpose the location of the first and second sections.

2. The interleaved turn winding of claim 1 wherein at least the first ends and the second ends of said first and second series paths are connected together, respectively.

3. A winding structure for electrical inductive apparatus comprising:
   a plurality of pancake coils,
   at least certain of said pancake coils having a plurality of insulated conductive strands spirally wound together to provide a plurality of sections, first means electrically interconnecting the sections of said pancake coils, to provide a plurality of parallel circuits through the winding, and to radially separate electrically similar points in the parallel circuits,
   second means electrically interconnecting said plurality of circuits in at least one of said pancake coils, at at least one of their electrically similar points,
   said second means including a plurality of first conductor means disposed at the outer periphery of said at least one pancake coil, with the number of first conductor means corresponding to the number of circuits to be interconnected, second conductor means, said second conductor means connecting each of said first conductor means to one of the electrically similar points to be interconnected, with said second conductor means extending radially inward to the point to be connected, in the event its associated point is not already located at the outer periphery of the pancake coil, and third conductor means, said third conductor means being connected to each of said plurality of first conductor means, to connect said electrically similar points in common.

4. The winding structure of claim 3 wherein said first conductor means are superposed, for at least a portion of their lengths.

5. The winding structure of claim 3 wherein said first conductor means are disposed on the same outer turn of said at least one pancake coil, and circumferentially spaced from one another.

6. The winding structure of claim 3 wherein said first and second conductor means are continuous integral extensions of the conductor points which are to be interconnected.

7. The winding structure of claim 3 wherein at least one of said second conductor means is a preformed U-shaped channel member.

8. The winding structure of claim 3 wherein said first conductor means includes two conductors, with one of said first conductor means being superposed on the other to form inner and outer first conductor means, said inner first conductor means having a looped portion which extends radially outward from said pancake coil, said outer first conductor means having a portion which is bent outwardly from said pancake coil, immediately adjacent the looped portion of said inner first conductor means, said third conductor means being connected to the bent and looped portions of said outer and inner first conductor means, respectively.

9. The winding structure of claim 3 wherein said first conductor means includes two conductors, which are both disposed against the outer periphery of said pancake coil, and terminate immediately adjacent one another where they are interconnected by said third conductor means.

10. The winding structure of claim 3 wherein two electrically similar points located at the inner and outer peripheries of said at least one pancake coil are interconnected.

11. The winding structure of claim 3 wherein two electrically similar points located at substantially the midpoint of the radial build and the outer periphery of said at least one pancake coil are interconnected.

12. The winding structure of claim 3 wherein two electrically similar points located at substantially the midpoint of the radial build and the inner periphery of said at least one pancake coil are interconnected.

13. An interleaved turn winding for electrical inductive apparatus comprising:
   at least first and second pancake coils,
   each of said pancake coils including at least first and second insulated electrically conductive strands spirally wound together to provide first and second radially interleaved sections having start and finish ends,
   the second section of each of said pancake coils being severed at least once to provide at least first and second radial portions which have inner and outer radially spaced ends,
   means connecting the inner and outer ends of the first and second radial portions of the second section together in each of said pancake coils,
   means interconnecting the finish end of the first section in the first pancake coil with the inner end of the second radial portion of the second section in the second pancake coil, to provide a first series path through the winding having first and second ends,
   and means connecting the outer end of the first radial portion of the second section of the first pancake coil with the start end of the first section of the second pancake coil, to provide a second series path through the winding having first and second ends.

14. The interleaved turn winding of claim 13 wherein at least the first ends and the second ends of said first and second series paths are connected together, respectively.

15. The interleaved turn winding of claim 13 wherein each pancake coil includes third and fourth insulated electrically conductive strands radially interleaved with said first and second insulated electrically conductive strands to provide third and fourth sections, each having start and finish ends, the fourth section of each pancake coil being divided into first and second radial portions in each pancake coil which have inner and outer radially disposed ends, means connecting the inner and outer ends of the first and second radial portions of said fourth section together, respectively, in each of said pancake coils, means connecting the finish end of the third section of a first pancake coil with the inner end of the second radial portion of a fourth section of the second pancake coil to provide a third series path through the winding having first and second ends, means connecting the outer end of the first radial portion of the fourth section of the first pancake coil with the start end of the third section of the second pancake coil, to provide a fourth series path through the winding having first and second ends.

16. The interleaved turn winding of claim 15 wherein at least the first ends, and the second ends of said first, second, third and fourth series paths through the winding are connected together, respectively.

17. The interleaved turn winding of claim 15 including at least third and fourth pancake coils constructed and interconnected in a manner similar to the construction and interconnection of said first and second pancake coils, said second and third pancake coils being interconnected, with the finish end of the first section of said second pancake coil being connected to the inner end of the second radial portion of the fourth section of said third pancake coil, the outer end of the first radial portion of the second section of said second pancake coil being connected to the start end of the third section of said third pancake coil, the finish end of the third section of said second pancake coil being connected to the inner end of the second radial portion of the second section of said third pancake coil, and the outer end of the first radial portion of the fourth section of said second pancake coil being connected to the start end of the first section of said third pancake coil.

18. The interleaved turn winding of claim 17 wherein at least the first ends and the second ends of said first, second, third and fourth series paths through the winding are connected together, respectively.

19. An interleaved turn winding for electrical inductive apparatus comprising:
   a plurality of pancake coils,
   each of said pancake coils including at least first and second insulated electrically conductive strands spirally wound together to provide first and second radially interleaved sections having start and finish ends,
   the second section of each of said pancake coils being divided into first, second, third and fourth radial portions each having inner and outer radially spaced ends,
   means connecting the inner and outer ends of the first and second radial paths, respectively, of the second section of each of said pancake coils,
   means connecting the inner and outer ends of the third and fourth radial portions, respectively, of the second section of each of said pancake coils,
   means connecting the outer end of the first radial portion with the inner end of the fourth radial portion in the second section of each of said pancake coils,
   means connecting the finish end of the first section in each pancake coil with the inner end of the second radial portion of the second section in the next adjacent pancake coil, to provide a first series path through the winding having first and second ends,
   and means connecting the outer end of the third radial portion of the second section of each pancake coil with the start end of the first section of the next adjacent pancake coil, to provide a second series path to the winding having first and second ends.

20. The interleaved turn winding of claim 19 wherein the first ends and the second ends of the first and second series paths through the winding are connected together, respectively.

21. A method of winding a two conductor mutually single interleaved, mixed electrical winding assembly having at least four pancake coils, comprising the steps of:
   winding the first half of a first pancake coil with first and second conductors,
   winding the second half of the first pancake coil with said first conductor and a third conductor,
   connecting the outer turn of the third conductor to the inner turn of the second conductor in said first pancake coil,
   winding the first half of a second pancake coil with said second conductor and a fourth conductor,
   winding the second half of the second pancake coil with said second and said first conductors,
   connecting the outer turn of the first conductor to the inner turn of the fourth conductor in said second pancake coil,
   winding the first half of a third pancake coil with said fourth conductor and a fifth conductor,
   winding the second half of the third pancake coil with said fourth and second conductors,
   connecting the outer turn of the second conductor to the inner turn of the fifth conductor in said third pancake coil,
   winding the first half of a fourth pancake coil with said fifth conductor and a sixth conductor,
   winding the second half of the fourth pancake coil with said fifth conductor and said fourth conductor,
   and connecting the outer turn of said fourth conductor to the inner turn of said sixth conductor.

22. The method of winding the electrical winding assembly of claim 21 including the step of connecting the inner turn of the first and third conductors together at said first pancake coils and connecting the outer turns of said fifth and sixth conductors together at said fourth pancake coil.

23. The method of winding the electrical winding assembly of claim 21 wherein the second half of each pancake coil is wound simultaneously with the first half of the next adjacent pancake coil.

24. The method of winding the electrical winding assembly of claim 21 using first, second, third and fourth reels of conductors, wherein said first, second, third and fourth conductors are from said first, second, third and fourth reels respectively, and said fifth and sixth conductors are from said third and first reels, respectively.

25. The method of winding the electrical winding assembly of claim 21 wherein the connections from the finish of one pancake coil to the center of the next pancake coil, and from the center of one pancake to the start of the next pancake, are continuous.

26. An electrical winding structure for electrical inductive apparatus comprising:
   a plurality of interleaved turn type pancake coils disposed in spaced side-by-side relation,
   conductor means electrically interconnecting said pancake coils in a predetermined manner,
   at least one of the electrical interconnections made by said conductor means being between distant pancake coils, which are separated by at least one intervening pancake coil,
   said conductor means which makes said at least one electrical connection between distant pancake coils being bent to successively enter the planes of each intervening pancake coil and form a predetermined portion of a turn therein.

27. The electrical winding structure of claim 26 wherein said at least one interconnection between distant pancake coils is disposed adjacent the inner turn of each of said intervening pancake coils.

28. The electrical winding structure of claim 26 wherein said at least one interconnection between distant pancake coils is disposed adjacent the outer turn of each of the intervening pancake coils.

29. An electrical winding assembly for electrical inductive apparatus comprising:
   a plurality of pancake coils,
   each of said pancake coils having first and second radially interleaved conductors,
   means interconnecting certain ends of the interleaved conductors of said pancake coils to provide first, second and third electrical circuits through the winding,
   said means connecting each group of six pancake coils to direct the first electrical circuit sequentially through the first, second, fifth and fourth pancake coils of the group, via one of the conductors of said pancake coils, the second electrical circuit sequentially through the second, third, sixth and fifth pancake coils of the group via one of the conductors of said pancake coils, and the third electrical circuit sequentially through the third, first, fourth and sixth pancake coils of the group via one of the conductors of said pancake coils,
   said electrical circuits traversing said first, third and fifth pancake coils of the group in a first radial direction, and the second, fourth and sixth pancake coils of the group in a direction opposite to the first radial direction.

30. An electrical winding assembly for electrical inductive apparatus comprising:
a plurality of pancake coils,
each of said pancake coils having first and second radially interleaved conductors,
means interconnecting certain ends of the interleaved conductors of said pancake coils to provide first, second, third and fourth electrical circuits through the winding,
said means connecting each group of four pancake coils to direct the first electrical circuit sequentially through the first and second pancake coils of the group via one of the conductors of said pancake coils, the second electrical circuit sequentially through the second and third pancake coils of the group via one of the conductors of said pancake coils, the third electrical circuit sequentially through the third and fourth pancake coils of the group via one of the conductors of said pancake coils, and the fourth electrical circuit sequentially through the fourth and first pancake coils of the group via one of the conductors of said pancake coils,
said electrical circuits traversing said first and third pancake coils of the group in a first radial direction, and the second and fourth pancake coils of the group in a direction opposite to said first radial direction.

31. An electrical winding for electrical inductive apparatus comprising:
a plurality of pancake coils disposed in side-by-side relation,
each of said pancake coils having first and second radially interleaved conductive strands to provide first and second interleaved sections,
said first and second conductive strands each being severed at least twice to provide at least three substantially equal radial portions, each having inner and outer ends, in each of the first and second sections,
first conductor means connecting the outer end of one of the outer radial portions with the inner end of one of the inner radial portions, in each of said pancake coils,
second conductor means connecting adjacent radial portions in pairs in each section of each pancake coil, other than the radial portions joined by said first conductor means,
and third conductor means interconnecting certain radial portions of adjacent pancake coils to form a winding having at least three separate electrical paths.

32. The electrical winding of claim 31 wherein said third conductor means connects each electrical path from one pancake coil to a different radial portion in the next adjacent pancake coil than any of the other electrical paths, to radially stagger the locations of the conductors entering each pancake coil.

33. An electrical winding for electrical inductive apparatus comprising:
a plurality of pancake coils disposed in spaced side-by-side relation,
each of said pancake coils having first and second radially interleaved electrically conductive strands to provide first and second interleaved sections,
said first and second electrically conductive strands each being severed to provide first, second and third substantially equal radial portions each having inner and outer ends, in each of the first and second sections,
first means connecting the outer and inner ends of the first and second radial portions, respectively, in said first section of each of said pancake coils,
second means connecting the outer and inner ends of the second and third radial portions, respectively, in said second section of each of said pancake coils,
third means interconnecting the inner end of the first radial portion of the second section with the outer end of the third radial portion of the first section, in each of said pancake coils,
and fourth means interconnecting the radial portions of said pancake coils to provide three separate circuits through said electrical winding.

34. The electrical winding of claim 33 wherein said fourth means connects:
(a) the outer end of the first radial portion of the second section of each pancake coil with the inner end of the second radial portion of the second section of the next adjacent pancake coil,
(b) the outer end of the second radial portion of the first section of each pancake coil with the inner end of the third radial portion of the first section of the next adjacent pancake coil, and
(c) the outer end of the third radial portion of the second section of each pancake coil with the inner end of the first radial portion of the first section of the next adjacent pancake coil.

35. The electrical winding of claim 34 wherein the inner ends of the first and third radial portions of the first section, and the second radial portion of the second section, of the first pancake coil are connected together, and the outer ends of the first and third radial portions of the second section, and the second radial portion of the first section, of the last pancake coil, are connected together.

36. The electrical winding of claim 33 wherein said fourth means connects:
(a) the outer end of the first radial portion of the second section of each pancake coil with the inner end of the first radial portion of the first section of the next adjacent pancake coil,
(b) the outer end of the second radial portion of the first section of each pancake coil with the inner end of the second radial portion of the second section of the next adjacent pancake coil, and
(c) the outer end of the third radial portion of the second section of each pancake coil with the inner end of the third radial portion of the first section of the next adjacent pancake coil.

37. The electrical winding of claim 36 wherein the inner ends of the first and third radial portions of the first section, and the second radial portion of the second section of the first pancake coil, are connected together, and the outer ends of the first and third radial portions of the second section and the second radial portion of the first section, of the last pancake coil, are connected together.

38. The electrical winding of claim 33 wherein said fourth means connects alternate adjacent pairs of pancake coils with start-start connections, and the remaining pairs of adjacent pancake coils with finish-finish connections, said start-start connections connecting the inner ends of the first radial portions of the first sections, the inner ends of the second radial portions of the second sections, and the inner ends of the third radial portions of the first sections, said finish-finish connections connecting the outer ends of the first radial portions of the second sections, the outer ends of the second radial portions of the first section, and the outer ends of the third radial portions of the second sections.

39. The electrical winding of claim 38 wherein the outer ends of the first and third radial portions of the second sections and the second radial portion of the first section, of the first pancake coil are interconnected, and the inner ends of the first and third radial portions of the first section and the second radial portion of the second section, of the last pancake coil, are interconnected.

40. An electrical winding for electrical inductive apparatus comprising:
a plurality of pancake coils disposed in spaced side-by-side relation,
each of said pancake coils having first and second radially interleaved electrically conductive strands, to provide first and second interleaved sections, said first and second electrically conductive strands each being severed to provide first, second, third and fourth substantially equal radial portions each having inner and outer ends, in each of the first and second sections, means connecting the outer and inner ends of the first and second radial portions, respectively, in said first section of each pancake coil, means connecting the outer and inner ends of the third and fourth radial portions, respectively, in said first section of each pancake coil, means connecting the outer and inner ends of the second and third radial portions, respectively, in the second sections of each of said pancake coils, means connecting the inner end of the first radial portion with the outer end of the fourth radial portion, respectively, in the second sections of each of said pancake coils, means connecting the outer and inner ends of the first radial portions in the second and first sections, respectively, of adjacent pancake coils, means connecting the outer and inner ends of the second radial portions in the first and second sections, respectively, of adjacent pancake coils, means connecting the outer and inner ends of the third radial portions in the second and first sections, respectively, of adjacent pancake coils, and means connecting the outer and inner ends of the fourth radial portions in the first and second sections, respectively, of adjacent pancake coils.

41. The electrical winding of claim 40 including means connecting the inner ends of the first, second, third and fourth radial portions in the first, second, first, and second sections, respectively, of the first pancake coil, and means interconnecting the outer ends of the first, second, third and fourth radial portions of the second, first, second and first sections, respectively, of the last pancake coil.

References Cited

UNITED STATES PATENTS

| | | | |
|---|---|---|---|
| 3,260,978 | 7/1966 | Müller | 336—187 |
| 3,246,270 | 4/1966 | Stein | 336—187 XR |
| 3,278,879 | 10/1966 | Stein | 336—70 XR |
| 3,299,385 | 1/1967 | Stein | 336—187 |

LEWIS H. MYERS, *Primary Examiner.*

THOMAS J. KOZMA, *Assistant Examiner.*

U.S. Cl. X.R.

29—605